United States Patent
Semidey

(10) Patent No.: US 11,942,843 B2
(45) Date of Patent: Mar. 26, 2024

(54) ROTOR FOR ELECTRONICALLY COMMUTATED DC MOTOR

(71) Applicant: East West Manufacturing, LLC, Atlanta, GA (US)

(72) Inventor: Stephen Andrew Semidey, Woodstock, GA (US)

(73) Assignee: East West Manufacturing, LLC, Atlanta, GA (US)

( * ) Notice: Subject to any disclaimer, the term of this patent is extended or adjusted under 35 U.S.C. 154(b) by 0 days.

(21) Appl. No.: 18/151,585

(22) Filed: Jan. 9, 2023

(65) Prior Publication Data
US 2023/0155435 A1  May 18, 2023

Related U.S. Application Data

(63) Continuation of application No. 17/145,724, filed on Jan. 11, 2021, now Pat. No. 11,552,520.

(60) Provisional application No. 62/961,446, filed on Jan. 15, 2020.

(51) Int. Cl.
| | |
|---|---|
| H02K 3/24 | (2006.01) |
| H02K 1/274 | (2022.01) |
| H02K 1/278 | (2022.01) |
| H02K 3/46 | (2006.01) |
| H02K 5/20 | (2006.01) |
| H02K 9/06 | (2006.01) |
| H02K 1/02 | (2006.01) |

(52) U.S. Cl.
CPC .............. *H02K 3/24* (2013.01); *H02K 1/274* (2013.01); *H02K 1/278* (2013.01); *H02K 3/46* (2013.01); *H02K 5/20* (2013.01); *H02K 9/06* (2013.01); *H02K 1/02* (2013.01)

(58) Field of Classification Search
CPC ............ H02K 3/24; H02K 1/27; H02K 1/274; H02K 3/26; H02K 5/20; H02K 9/06; H02K 1/02
See application file for complete search history.

(56) References Cited

U.S. PATENT DOCUMENTS

| 2,493,102 A | * | 1/1950 | Brainard | ................ H02K 1/276 |
| | | | | 164/109 |
| 5,397,951 A | * | 3/1995 | Uchida | ................... H02K 1/278 |
| | | | | 310/91 |
| 2005/0012411 A1 | | 1/2005 | Hoffman et al. | |

(Continued)

FOREIGN PATENT DOCUMENTS

| CN | 102820739 | 12/2012 |
| DE | 102011080265 | 2/2013 |

(Continued)

OTHER PUBLICATIONS

WO-2013175832-A1, OKa et al., all pages (Year: 2013).*

(Continued)

*Primary Examiner* — Naishadh N Desai
(74) *Attorney, Agent, or Firm* — Smith Gambrell & Russell LLP

(57) ABSTRACT

An EC motor with a rotor. The rotor has a hub with outwardly extending silicon steel laminates with gaps between. Rectangular neodymium permanent magnets are positioned in the gaps. Wedge-shaped ferrite permanent magnets are positioned radially between the silicon steel laminates and the hub of the rotor.

6 Claims, 24 Drawing Sheets

(56) References Cited

U.S. PATENT DOCUMENTS

| | | |
|---|---|---|
| 2005/0035673 A1 | 2/2005 | Lafontaine et al. |
| 2009/0298011 A1 | 12/2009 | Thoms et al. |
| 2010/0001729 A1* | 1/2010 | Katznelson ........ G01R 33/3806 |
| | | 324/318 |
| 2010/0187920 A1 | 7/2010 | Best |
| 2012/0001503 A1 | 1/2012 | Owng et al. |
| 2012/0007452 A1 | 1/2012 | Bingler |
| 2012/0299409 A1* | 11/2012 | Choi ..................... H02K 21/12 |
| | | 310/64 |
| 2013/0270948 A1 | 10/2013 | Unterfrauner et al. |
| 2014/0102674 A1* | 4/2014 | Manz ................... H02K 1/2773 |
| | | 29/598 |
| 2014/0103770 A1* | 4/2014 | Brahmavar ............. H02K 1/27 |
| | | 29/596 |

FOREIGN PATENT DOCUMENTS

| | | | |
|---|---|---|---|
| KR | 20160093044 | 8/2016 | |
| WO | WO-2013175832 A1 * | 11/2013 | ............... H02K 1/27 |

OTHER PUBLICATIONS

WO-2013175832-A1, Oka, all pages (Year: 2013).*
Examiner's First Office Action released by the Canadian Patent Office dated Aug. 25, 2023 for corresponding Canadian Patent Application No. 3,163,828; 4 pages.

* cited by examiner

ROTOR FOR ELECTRONICALLY COMMUTATED DC MOTOR

CROSS REFERENCE TO RELATED PATENT APPLICATIONS

This patent application is a continuation of application Ser. No. 17/145,724, filed Jan. 11, 2021, which claims priority from U.S. provisional patent application No. 62/961,446, filed Jan. 15, 2020, which is hereby incorporated by reference.

FIELD OF THE INVENTION

This invention relates to electronically commutated DC motors (EC motors), and more particularly to an EC motor air cooling system, an optimized permanent magnet rotor, and a unitary over molded housing.

BACKGROUND OF THE INVENTION

In one embodiment, an internal rotor EC motor comprises a stator with a series of circumferentially spaced electromagnets and a rotor position inside the stator and mounted for rotation on a shaft. The rotor has circumferentially spaced permanent magnets. An electronic controller controls the electrical energy delivered to the coils of the electromagnets of the stator. By controlling the electrical energy delivered to the coils of the stator, a rotating magnetic field is created that in turn attracts the permanent magnets of the rotor to cause the rotor to spin on its shaft.

In another embodiment, an external rotor EC motor comprises a stator with circumferentially spaced electromagnets. Such an EC motor has a rotor with permanent magnets positioned on the outside of the stator. Whether an internal rotor or an external rotor, the operating principles of the EC motor are generally the same in that rotating magnetic field is created by the stator that attracts the permanent magnets of the rotor to cause rotation of the rotor.

During operation, heat is generated both by the electronic controller and in the stator coils. Consequently, an EC motor requires a system for dissipating the heat from the control circuitry and the stator coils.

The configuration of permanent magnets and steel laminates that make up the rotor can have an effect on the performance of an EC motor. Such performance can be improved by constructing a rotor with a combination of permanent magnets sized and spaced around the rotor.

During operation, the switching of the electric current in the stator coils can result in unwanted vibration and noise. Further, for certain applications for EC motors, the cost and weight of the motor components, including the motor housing, are important to purchasers.

SUMMARY OF THE INVENTION

In order to overcome the problem of heat dissipation in an EC motor of the present invention, the EC motor includes an impeller fan attached to a rotating shaft of the rotor. The impeller fan draws ambient air into the housing of the EC motor. The ambient air is drawn toward the impeller fan through circumferentially spaced air inlets and then through radially oriented air passages that are adjacent to the electronic controller. As ambient air passes through the radially oriented air passages, the ambient air absorbs heat from the electronic controller. Once the ambient air has been drawn through the radially oriented air passages and into the impeller fan, the air is forced by the impeller fan along axially oriented stator cooling channels between the coils of the stator. After absorbing heat from the stator coils, the air is exhausted axially or radially through air outlets in the housing. The impeller fan has planar fins oriented parallel to the rotor shaft so that the cooling air flows in one direction regardless of the direction of rotation of the rotor and attached impeller fan.

For the internal rotor embodiment, the stator comprises a structural circular core back with inwardly extending teeth of laminated steel. Energizing coils are wound around the individual teeth and insulated from the teeth. The teeth have concave inner ends that define a circular opening into which the circular internal rotor is positioned. The dimensions of the teeth and the rotor provide an air gap between the concave inner ends of the teeth and the outer circumference of the rotor.

The internal rotor EC motor includes an over molded housing that comprises a cylindrical outer shell and an inwardly extending stator coil section. The stator coil sections encapsulate the coils and the teeth (except for the concave inner ends). The housing is created by over molding the stator with plastic. The plastic is Rynite polyethylene terephthalate (available from DuPont) or any other plastic material having similar molding and heat transfer characteristics. Encapsulating the stator coils and teeth reduces noise and vibration. Further, replacing a metal cylindrical outer shell with a plastic shell contributes to weight reduction and lower cost of materials and manufacturing.

In order to optimize performance of the internal rotor EC motor of the present invention, the rotor has permanent magnets and silicon steel laminates positioned around a central hub. The silicon steel laminates are positioned around the outer circumference of the rotor and are spaced circumferentially around the rotor with gaps between the adjacent silicon steel laminates. Rectangular shaped permanent magnets are interposed in the gaps between the silicone steel laminates. Wedge-shaped magnets are aligned radially with the silicon steel laminates and between the steel laminates and the central hub of the rotor. The performance of the rotor is optimized by adjusting the sizes, shapes, and locations of the silicon steel laminates, the rectangular magnets, and the wedge-shaped magnets.

For the external rotor EC motor, the stator has a central hub from which the steel laminate teeth extend radially outward. The outer end of each of the teeth has a convex outer surface. The outer surfaces of the teeth form a circle. The rotor comprises a cylindrical shell with a series of spaced apart permanent magnets attached to the internal surface of the cylindrical shell. The permanent magnets are dimensioned with an inwardly facing concave surface that matches the convex outer surface of the teeth. The cylindrical shell and magnets are dimensioned so that an air gap exists between the convex outer surfaces of the teeth and the internal concave surfaces of the permanent magnets. The rotor has a disc shaped end cover with fan blades attached to the internal surface of the end cover. The cylindrical shell also has a series of circumferentially spaced openings that serve as air outlets for the air pressure created by the fan blades.

The fan of the external rotor EC motor draws air into the EC motor. The air enters the EC motor on one side of the stator, passes by heatsinks attached to the electronic circuitry, passes axially through stator air channels, and exits through the air outlets in the cylindrical shell of the rotor. Because the fan blades of the impeller fan are planar and not curved, the cooling air is unidirectional regardless of the direction of rotation of the rotor and the fan.

The stator is over molded with plastic in order to dampen vibrations. Likewise, the housing surrounding the stator and the electronic controller is over molded.

Further objects, features and advantages will become apparent upon consideration of the following detailed description of the invention when taken in conjunction with the drawings and the appended claims.

DETAILED DESCRIPTION OF THE PREFERRED EMBODIMENTS

Figure 1:
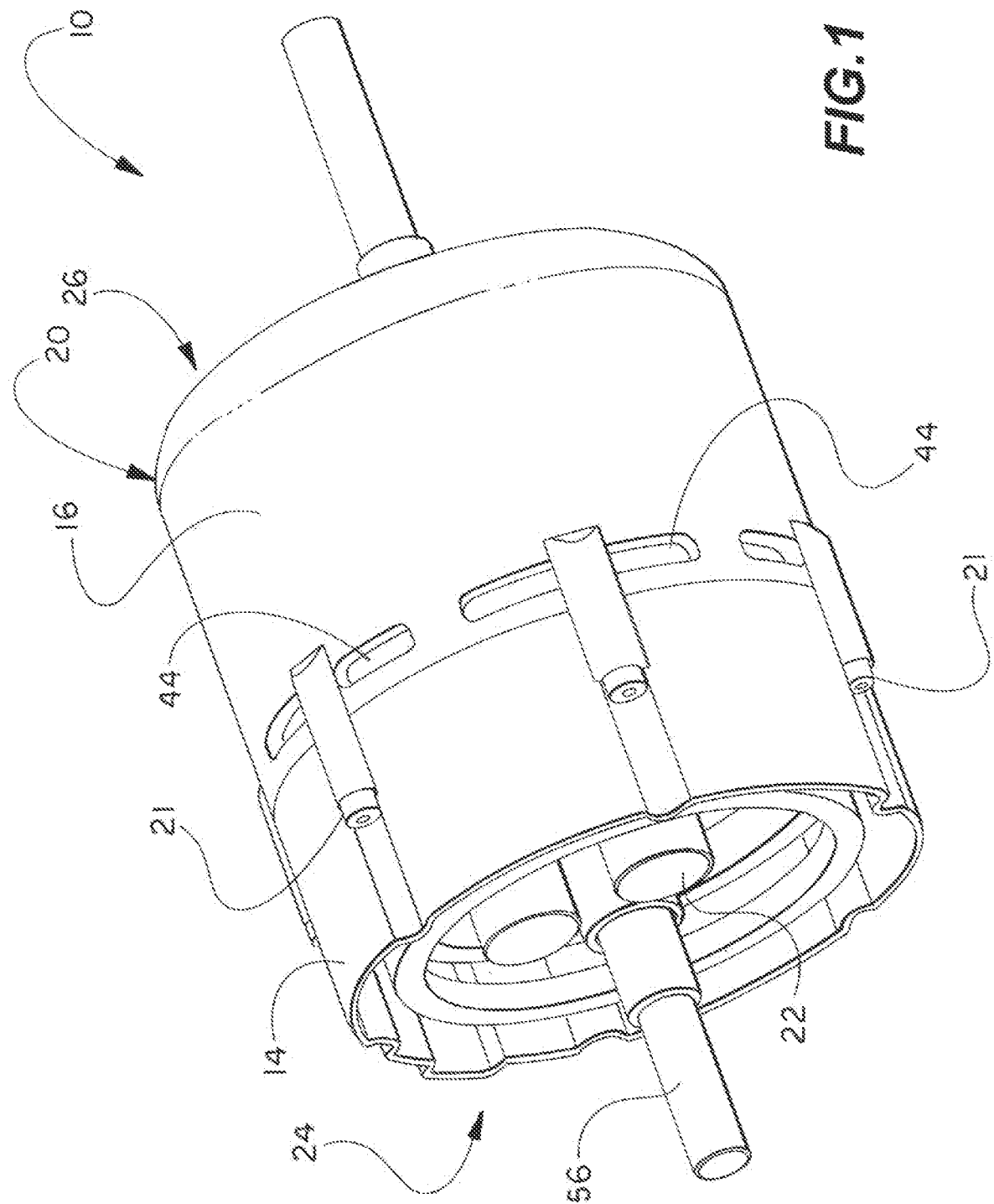
FIG. 1 is a perspective view of an internal rotor EC motor in accordance with the present invention.
Figure 2:
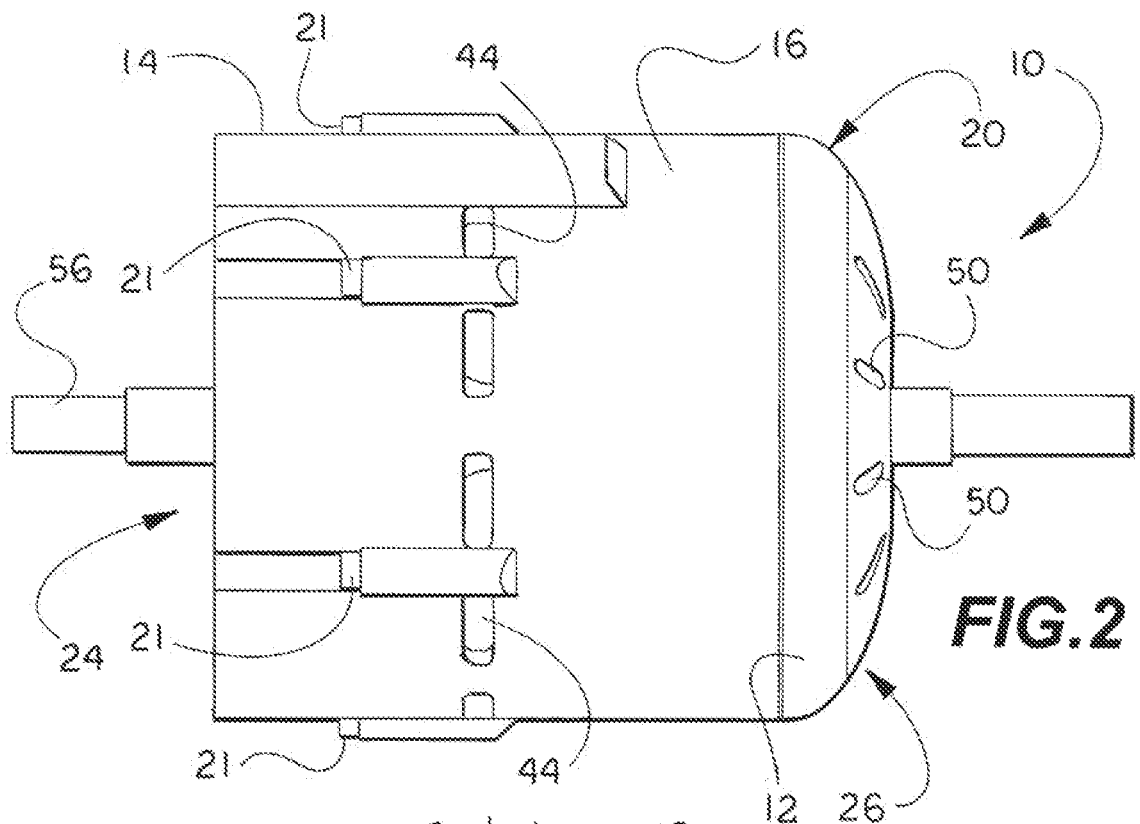
FIG. 2 is a side elevation view of the internal rotor EC motor in accordance with the present invention.
Figure 3:
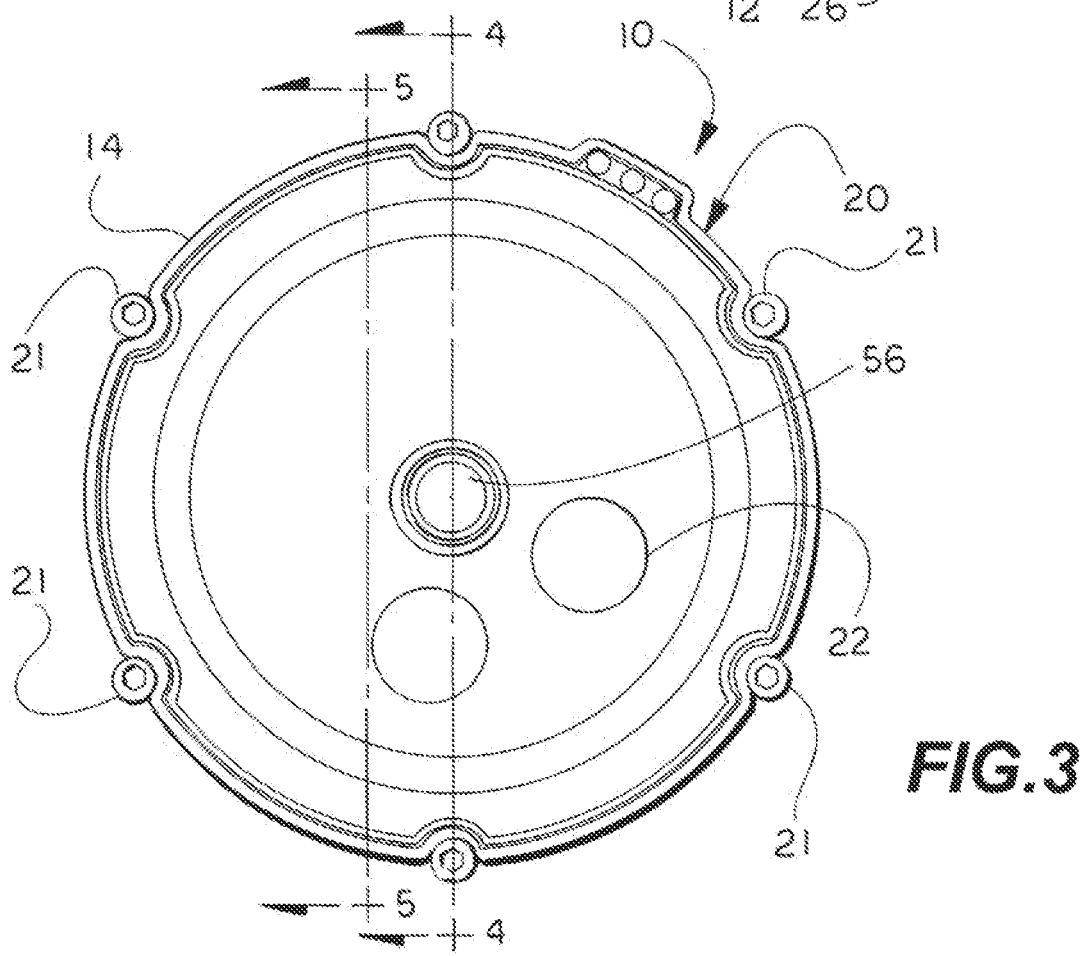
FIG. 3 is a left end elevation view of the internal rotor EC motor in accordance with the present invention.
Figure 4:
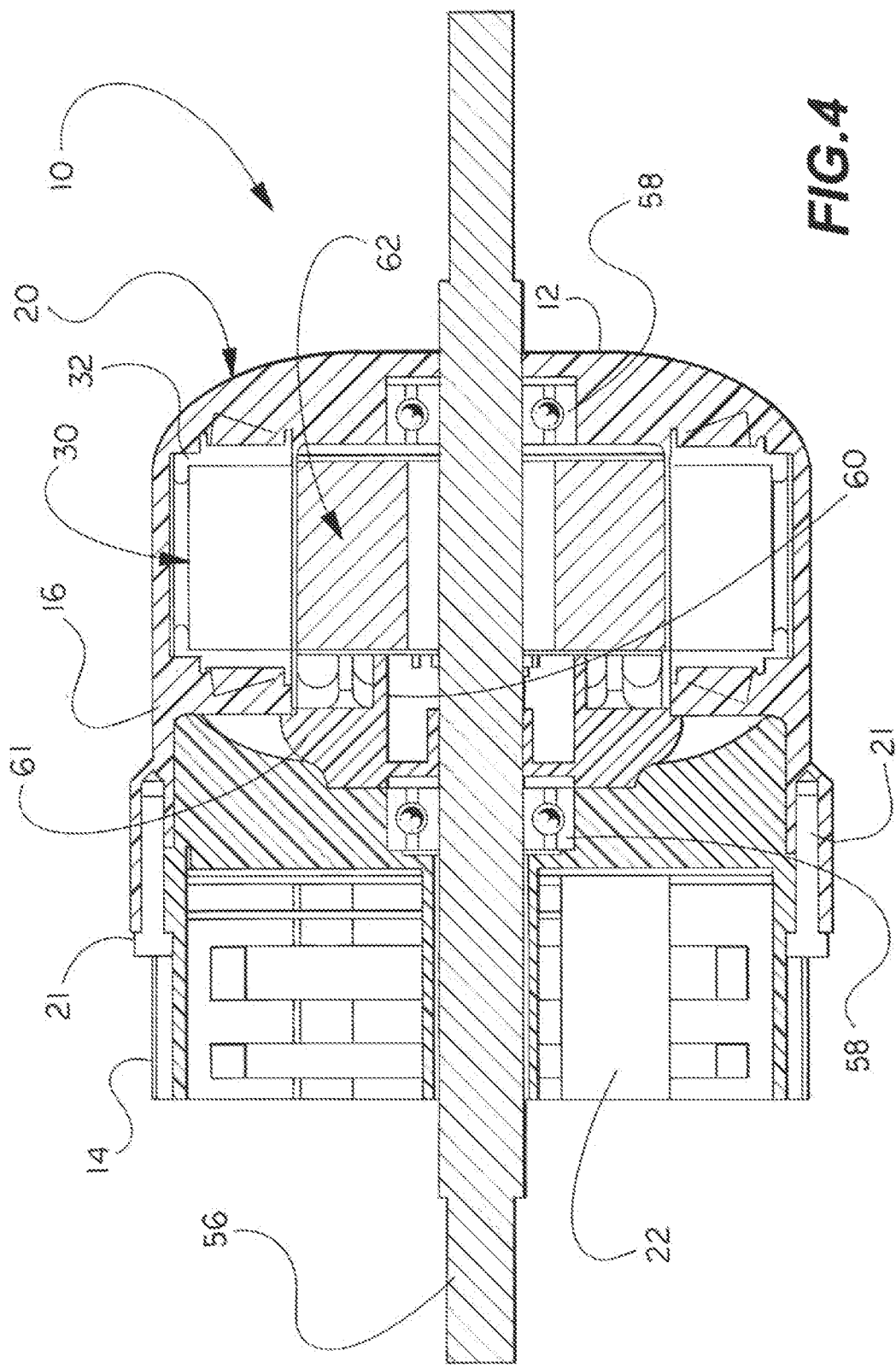
FIG. 4 is a section view of the internal rotor EC motor as seen along line 4-4 of FIG. 3 in accordance with the present invention.
Figure 5:
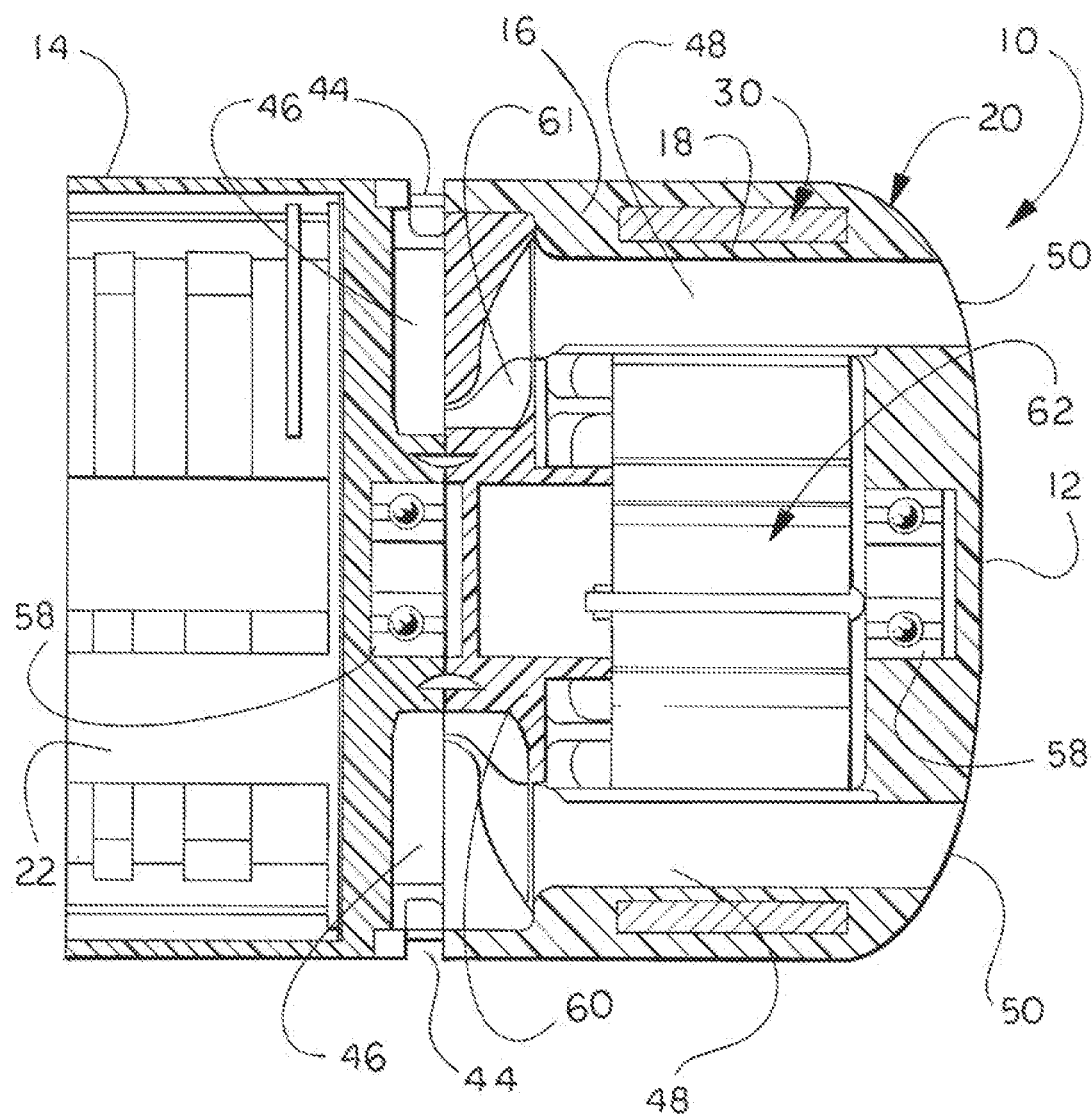
FIG. 5 is a section view of the internal rotor EC motor as seen along line 5-5 of FIG. 3 in accordance with the present invention.

Turning to FIGS. 1-6, an internal rotor, electronically commutated DC motor 10 (internal rotor EC motor) has a housing 20 that includes a cylindrical controller shell 14, a cylindrical stator shell 16, and a right end portion 12. The cylindrical controller shell 14 is attached to the cylindrical stator shell 16 by means of circumferentially spaced screws 21. An electronic controller 22 is mounted inside the cylindrical controller shell 14. The internal rotor EC motor 10 has a left end 24 and a right end 26.

The internal rotor EC motor 10 has an outer stator 30 and an internal ferrite rotor 62. With reference to FIGS. 8-11, the stator 30 has a structural circular core back 32 with inwardly extending steel laminate teeth 34 that terminate in concave inner ends 35. The teeth 34 are circumferentially spaced around the circular core back 32 and define an opening 28 for accommodating the rotor 62. The teeth 34 are wound with electromagnetic coils 38 that are insulated from the teeth 34.

The right end portion 12, the cylindrical stator shell 16, and the stator coil section 18 of the housing 20 are produced by plastic over molding of the stator 30. The plastic over molding encapsulates all of the stator circular core back 32, the stator coils 38, and the teeth 34 except for the concave inner ends 35 of the teeth 34. As a result of over molding of the circular core back 32, the teeth 34, and the stator coils 38, axially oriented stator coil open passages 48 (FIGS. 5 and 7) our created between the teeth 34. The plastic used to over mold the stator and create the housing 20 is Rynite polyethylene terephthalate (available from DuPont) or any other plastic materials having similar molding and heat transfer characteristics.

Figure 7:
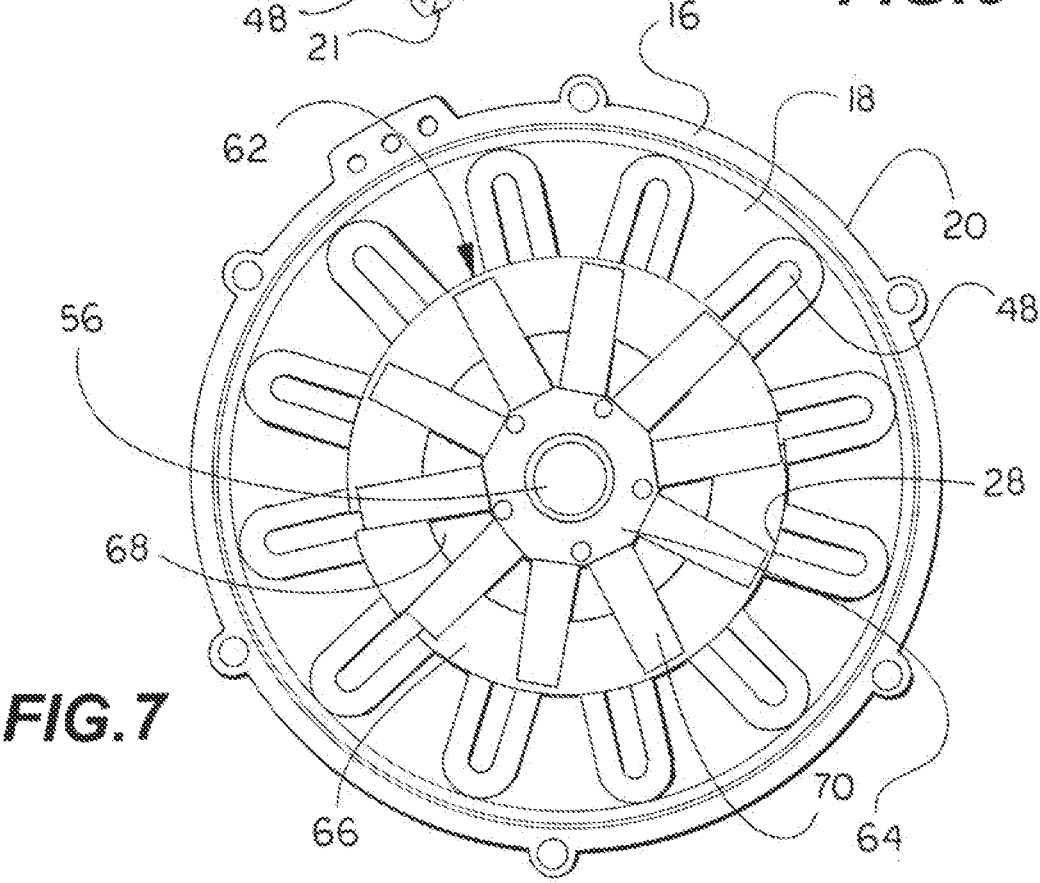
FIG. 7 is a right end elevation view of the internal rotor EC motor with the electronic controller and impeller fan removed to show internal detail in accordance with the present invention.
Figure 8:
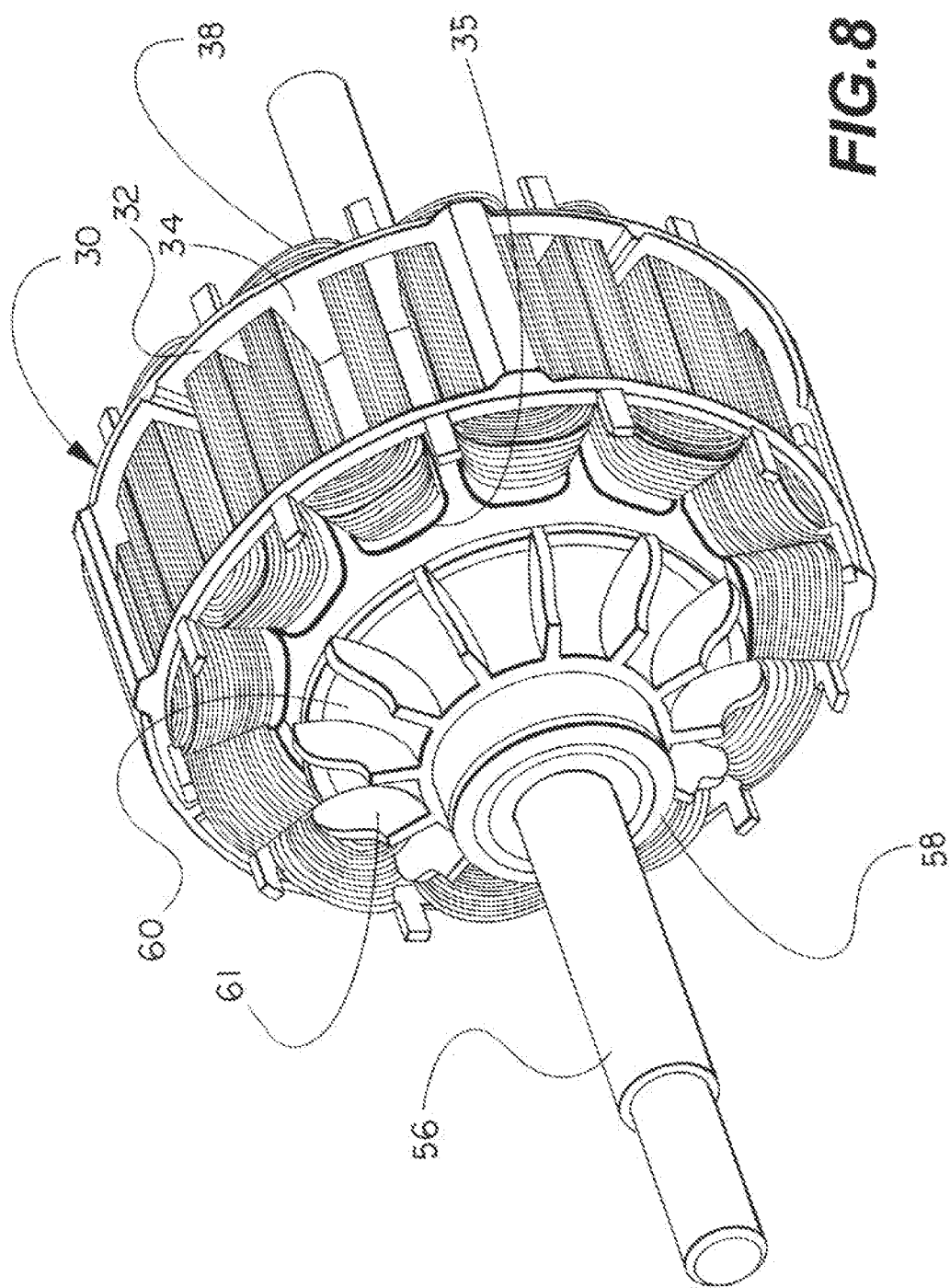
FIG. 8 is a perspective view of the stator, the rotor, and the impeller fan of the internal rotor EC motor in accordance with the present invention.
Figure 9:
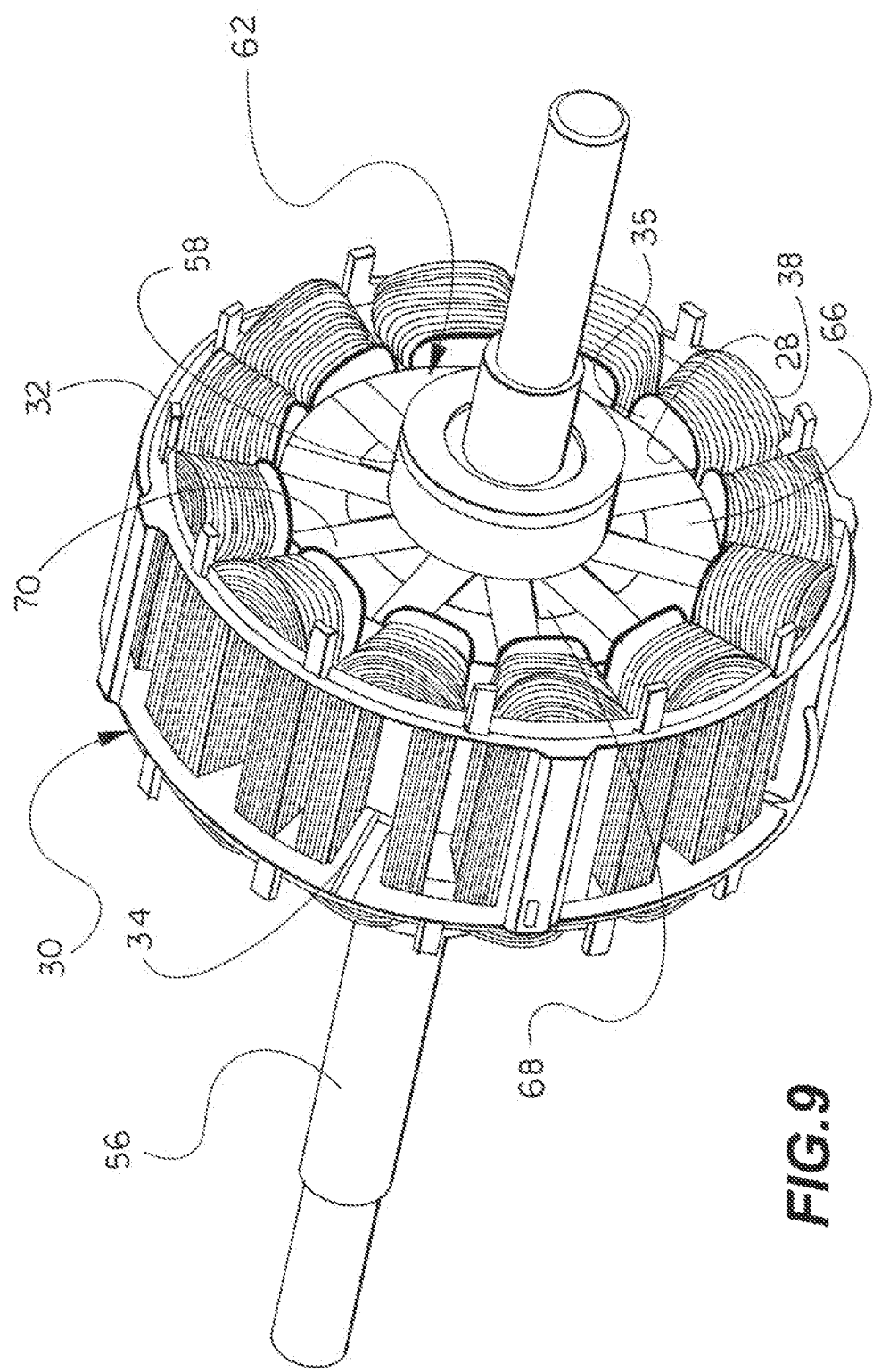
FIG. 9 is a perspective view of the stator and the rotor of the internal rotor EC motor in accordance with the present invention.
Figure 10:
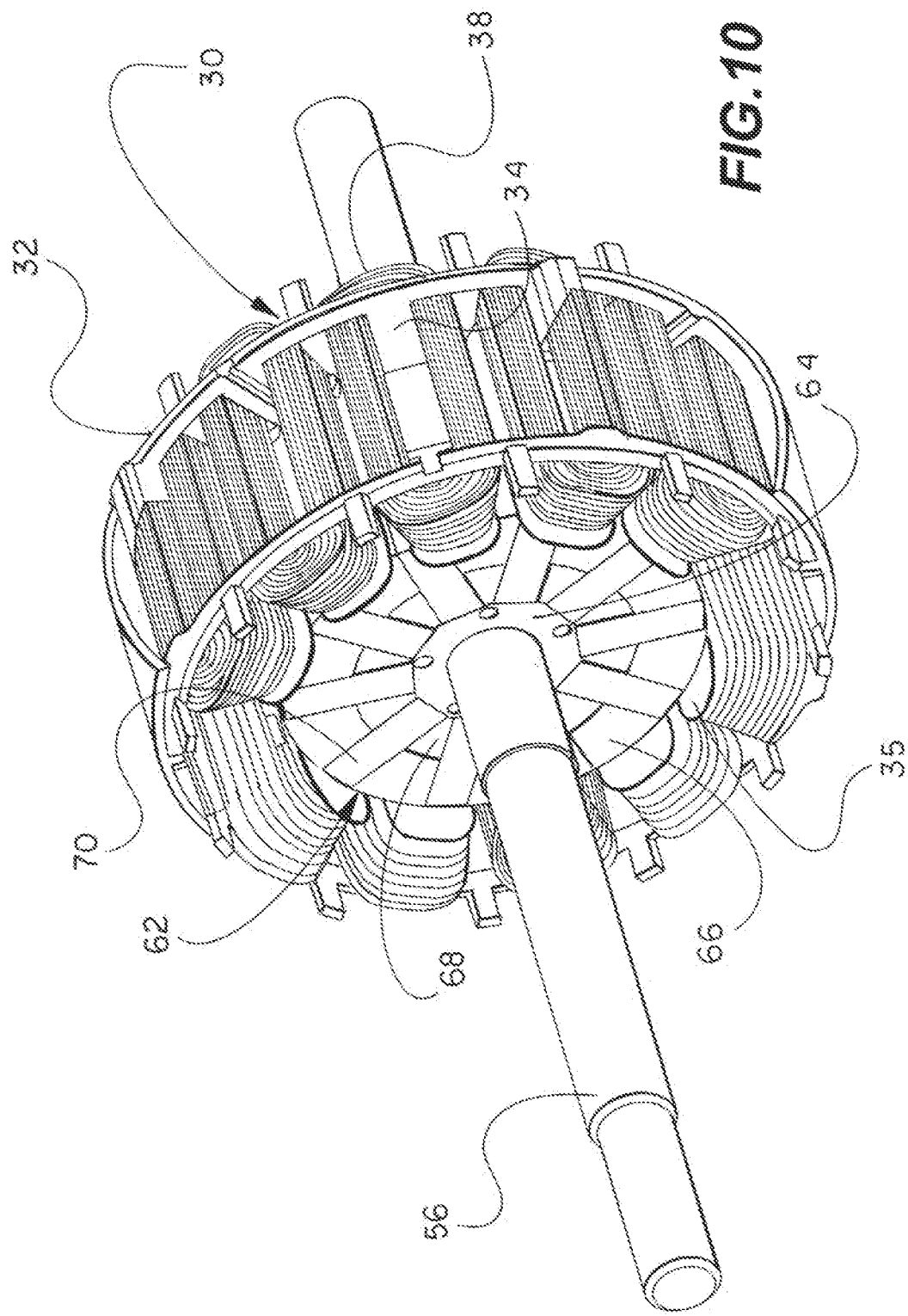
FIG. 10 is a perspective view of the stator and the rotor of the internal rotor EC motor in accordance with the present invention.
Figure 11:
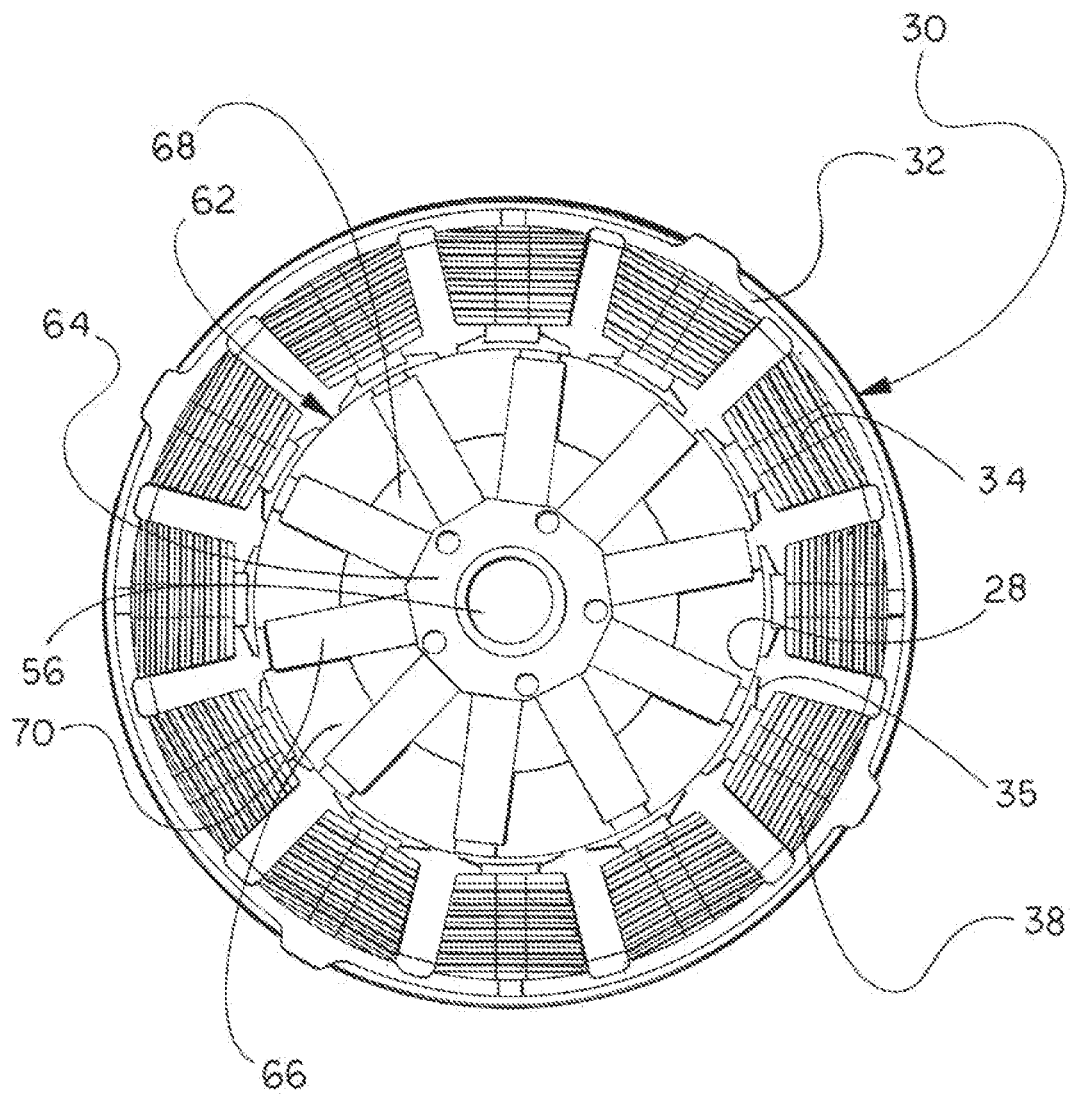
FIG. 11 is a right end elevation view of the stator and the rotor of the internal rotor EC motor in accordance with the present invention.

The ferrite rotor 62 is mounted on a shaft 56. The shaft in turn is mounted on bearings 58 for rotation of the rotor and shaft inside the opening 28 of the stator 30 (FIGS. 7 and 9). An impeller fan 60 with impeller fan blades 61 is attached to the shaft 56 for rotation with the shaft 56 and the rotor 62.

The electronic controller 22 controls the energization of the coils 38 of the stator 30 to produce a rotating magnetic field to interact with permanent magnets comprising part of the rotor 62 to produce rotation of the rotor 62. As a result, the electronic controller 22 produces heat that must be dissipated from the EC motor 10. In addition, energization of the electromagnetic stator coils 38 to produce the rotating magnetic field also produces heat that must be dissipated from the internal rotor EC motor 10.

Figure 6:
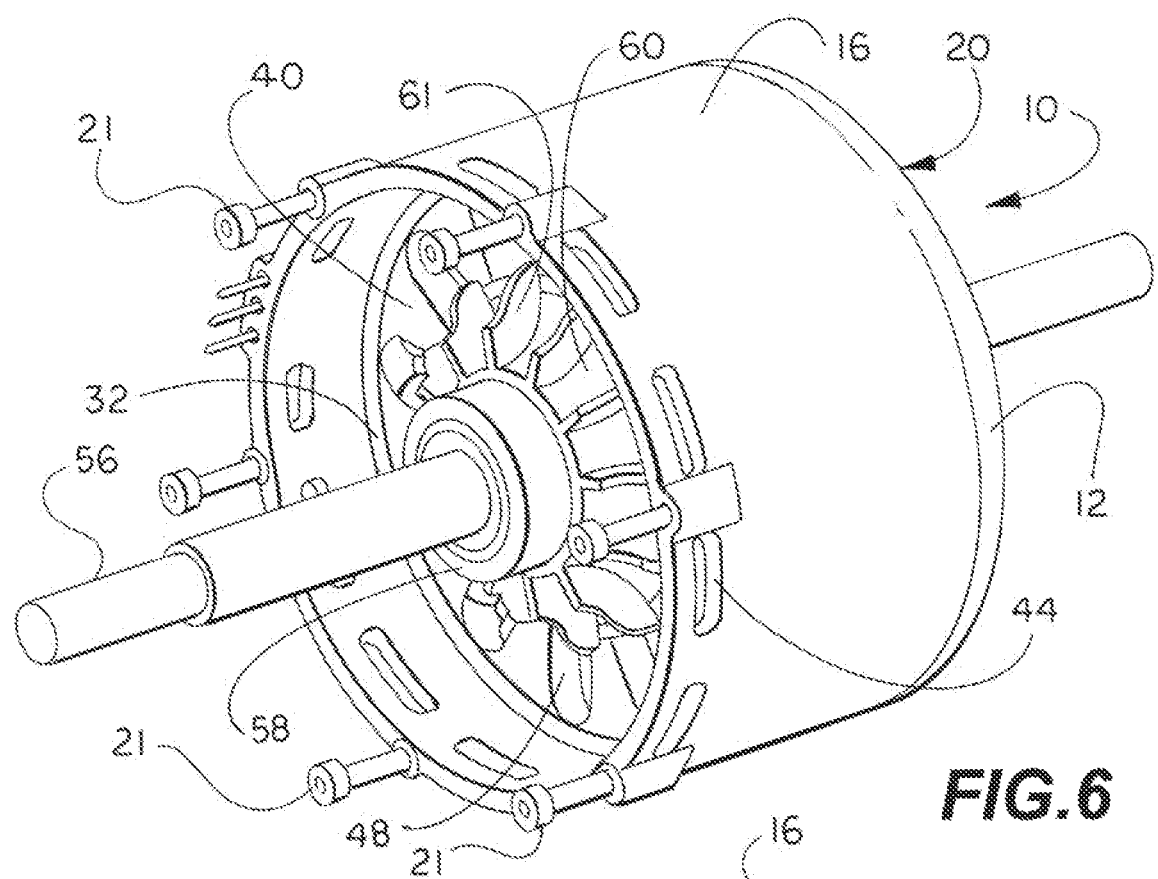
FIG. 6 is a perspective view of the internal rotor EC motor with the electronic controller removed to show internal detail in accordance with the present invention.

In order to deal with the heat produced by the electronic controller 22 and the stator coils 38, the internal rotor EC motor 10 has an air management system that includes the impeller fan 60, air inlets 44, radially oriented air passages 46, axially oriented stator cooling passages 48 in the stator 30, and air outlets 50 in the right end portion 12 of the housing 20. The radially oriented air passages 46 are routed adjacent to the cylindrical controller shell 14 and thereby adjacent to the electronic controller 22. The proximity of the radially oriented air passages 46 to the electronic controller 22 assists in dissipating heat from the electronic controller 22. Likewise, the axially oriented open cooling passages 48 pass directly through the stator 30 and adjacent to and between the stator coils 38. In operation, ambient air is drawn into air inlets 44 and through the radially oriented air passages 46 by the impeller fan 60. The air is then expelled from the impeller fan through the axially oriented cooling passages 48 and out of the air outlets 50. As best shown in FIG. 6, the impeller fan blades 61 of the impeller fan 60 are planar. Consequently, the air flows from the air inlets 44 to the air outlets 50 regardless of the direction of rotation of the impeller fan 60. While the air management system 42 of the present invention has been described with respect to the internal rotor EC motor 10, the operative principles of the air management system 42 are equally applicable to other electric motors.

Figure 12:
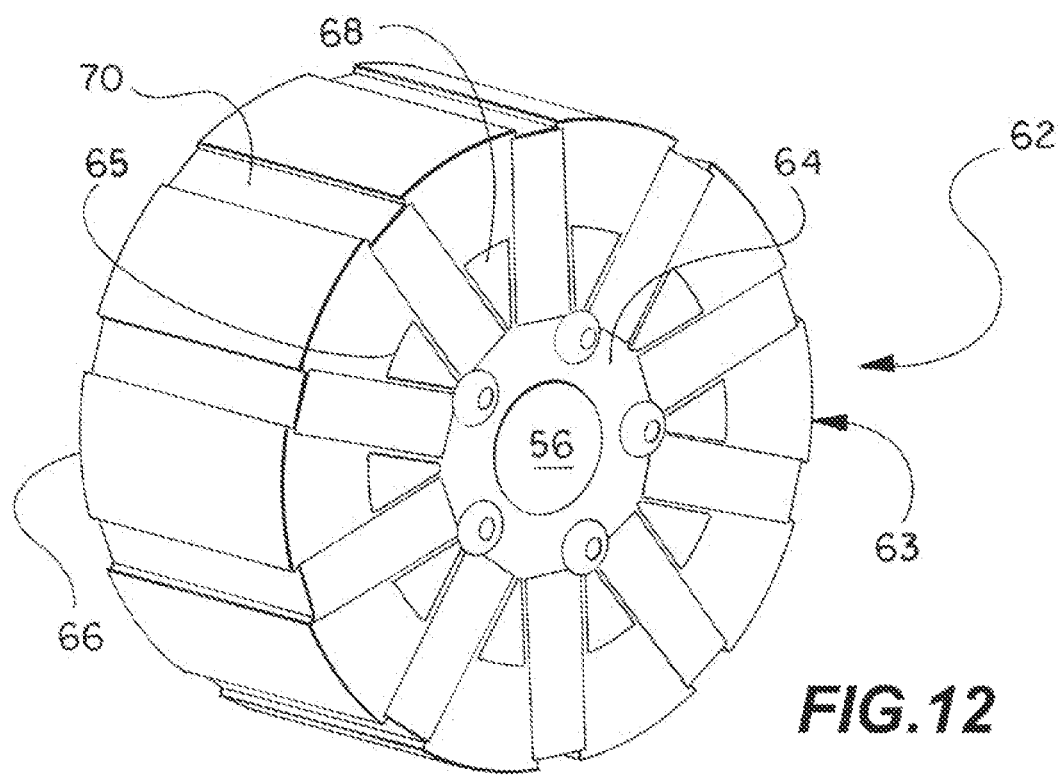
FIG. 12 is a perspective view of a first embodiment of the rotor (ferrite rotor) of the internal rotor EC motor in accordance with the present invention.
Figure 13:
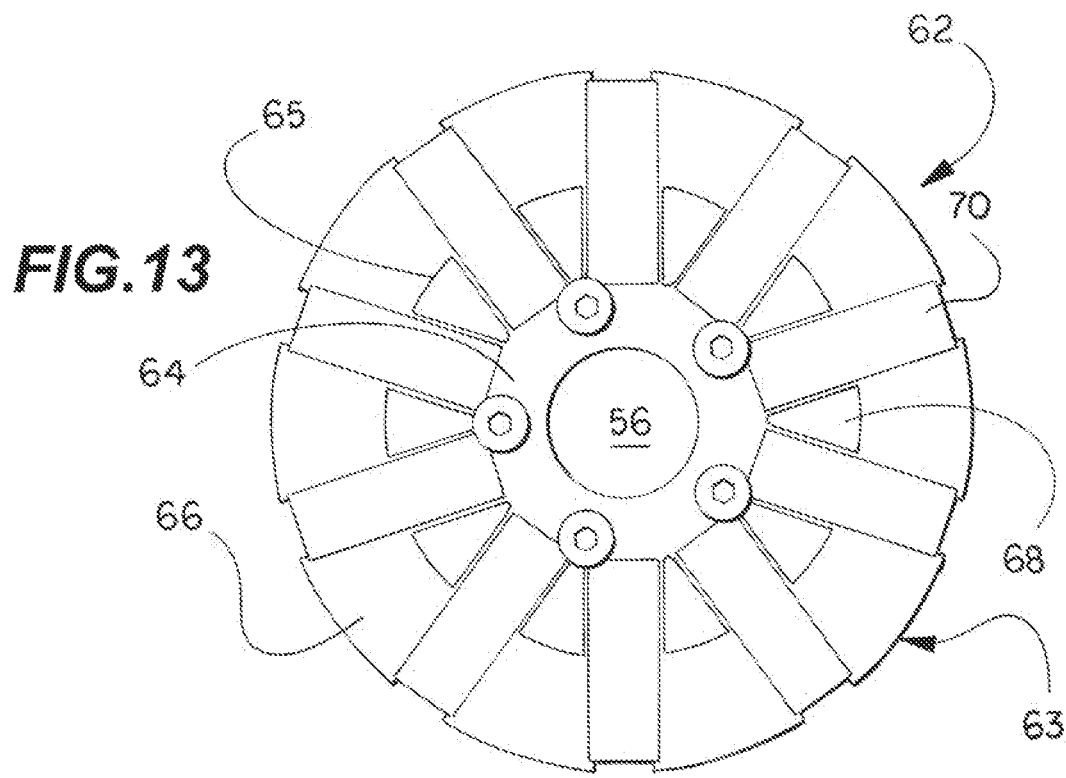
FIG. 13 is an elevation view of the first embodiment of the rotor (ferrite rotor) of the internal rotor EC motor in accordance with the present invention.

Turning to FIGS. 12 and 13, the ferrite rotor 62 has a hub 64 attached to the shaft 56. The hub 64 supports 10 silicon steel laminates 66 evenly spaced around an outer circumference 63 of the rotor 62. Rectangular shaped permanent ferrite magnets 70 are positioned within gaps between adjacent steel laminates 66 and are slightly recessed from the outer circumference 63 of the rotor 62. Wedge-shaped permanent ferrite magnets 68 are positioned radially between the silicon steel laminates 66 and the hub 64 and are spaced circumferentially from each other.

Figure 14A:
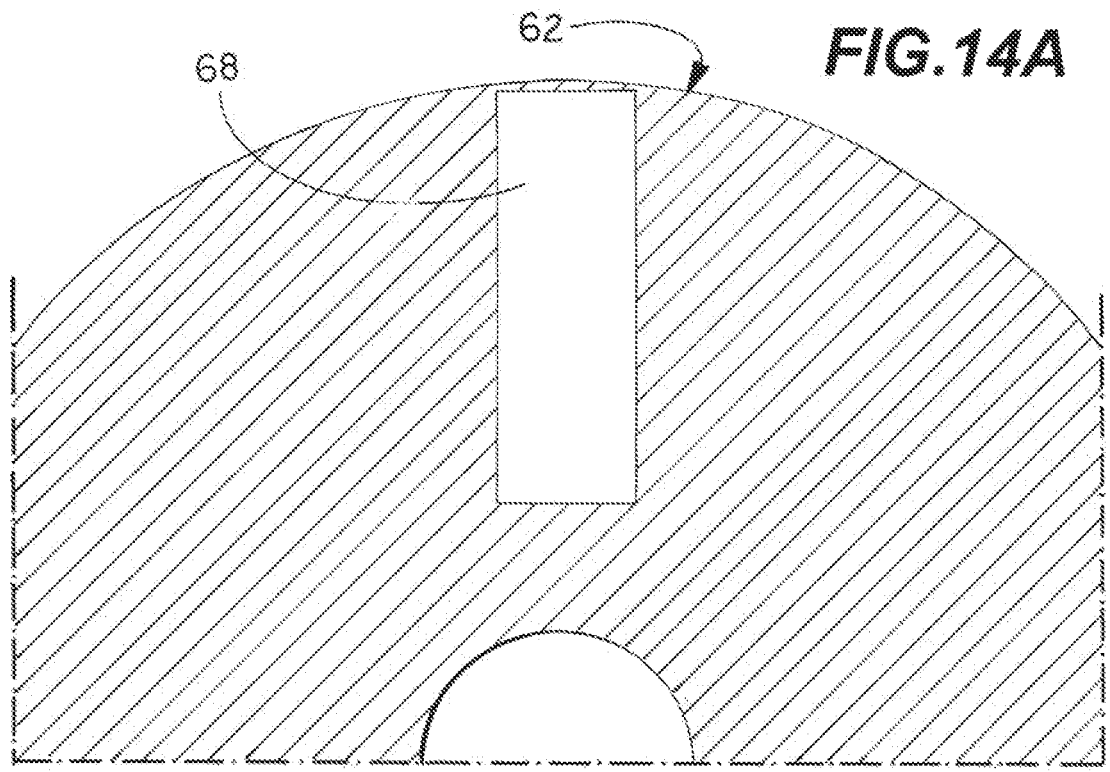
FIGS. 14A and 14B are schematic views of the first embodiment of the rotor (ferrite rotor) of the internal rotor EC motor in accordance with the present invention.
Figure 14B:
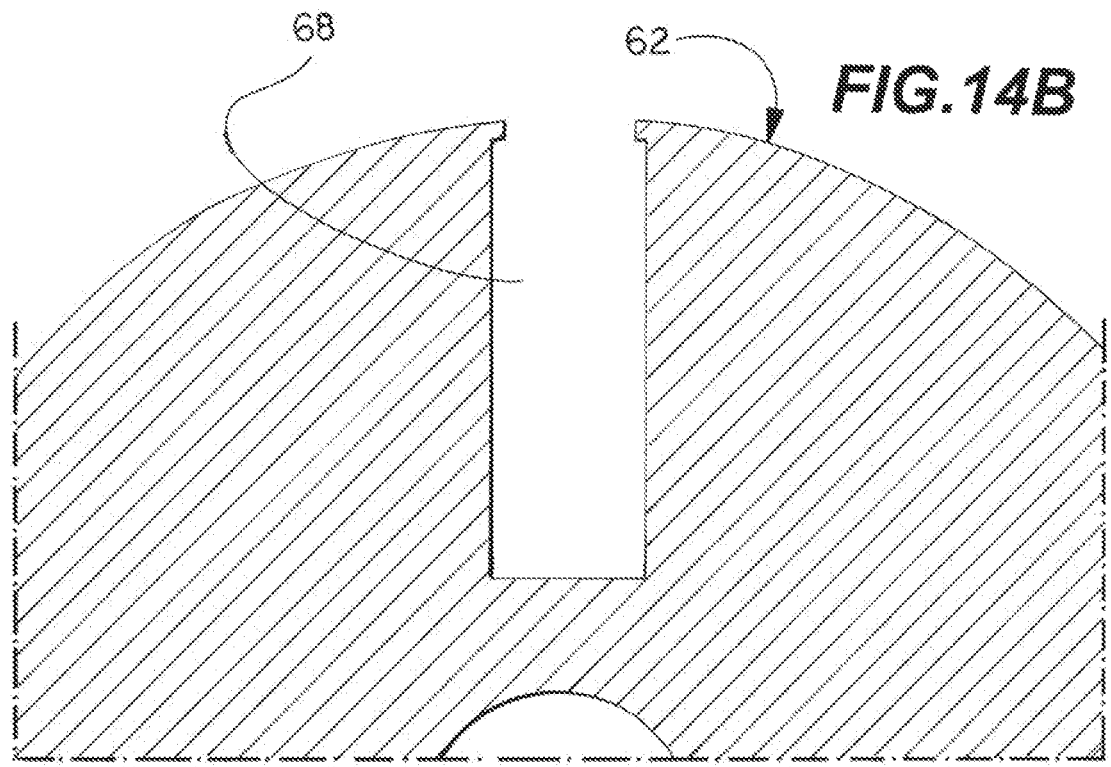

Turning to FIGS. 14A and 14B, the ferrite rotor 62 was optimized using Maxwell 2D FEA software. The width and length of the rectangular magnets 70 were varied to maximize torque output. The width of the rectangular magnets 70 was first set, and then the maximum length of the rectangular magnets was determined so that the rectangular magnets fit in the rotor without the magnets interfering with each other (see FIGS. 14A and 14B). The area of each configuration was calculated, and the maximum area was selected (see Table 1).)

TABLE 1

| Width (mm) | Length (mm) | Area of Rectangle (mm$^2$) | Area of wedge (mm$^2$) | Total Area (mm$^2$) |
|---|---|---|---|---|
| 5 | 23.08 | 115.4 | 60 | 175.4 |
| 6 | 21.54 | 129.24 | 46.83 | 176.07 |
| 7 | 20 | 140 | 35.17 | 175.17 |
| 8 | 18.46 | 147.68 | 25.14 | 172.82 |

TABLE 1-continued

| Width (mm) | Length (mm) | Area of Rectangle (mm$^2$) | Area of wedge (mm$^2$) | Total Area (mm$^2$) |
|---|---|---|---|---|
| 9 | 16.92 | 152.28 | 16.74 | 169.02 |
| 10 | 15.38 | 153.8 | 9.99 | 163.79 |
| 11 | 13.84 | 152.24 | 4.9 | 157.14 |

Figure 15A:
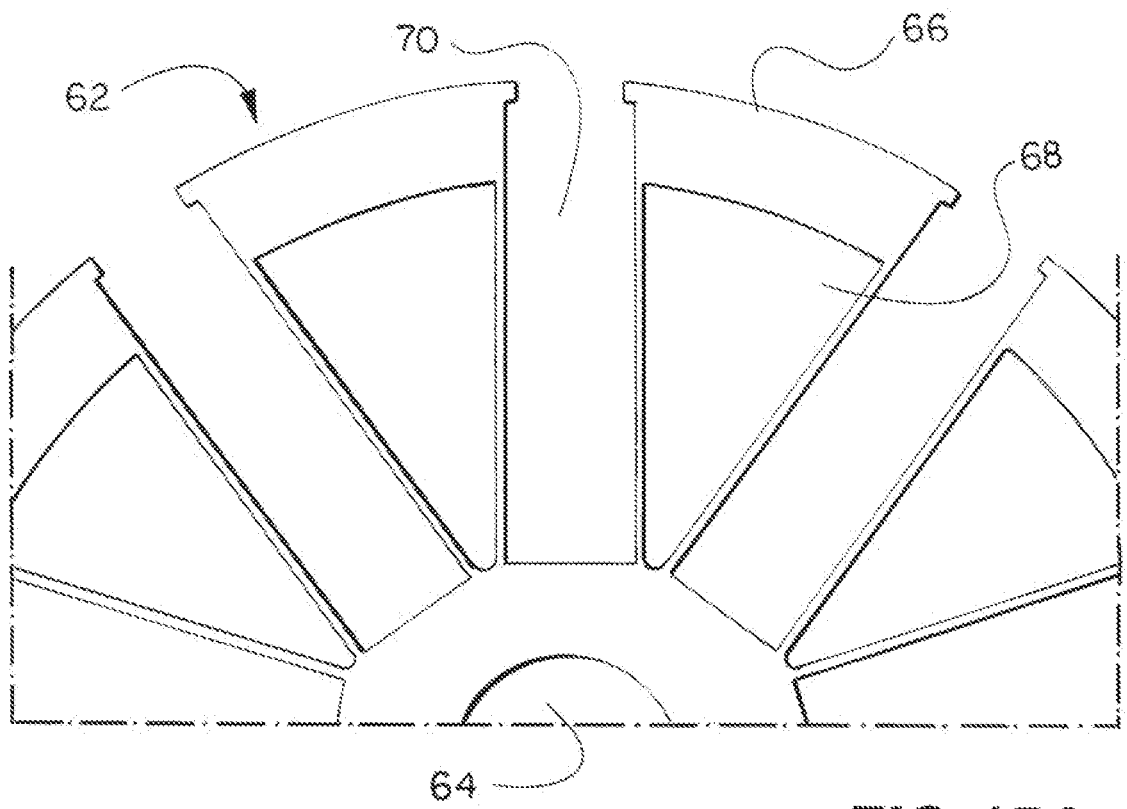
FIGS. 15A and 15B are schematic views of the first embodiment of the rotor (ferrite rotor) of the internal rotor EC motor in accordance with the present invention.
Figure 15B:
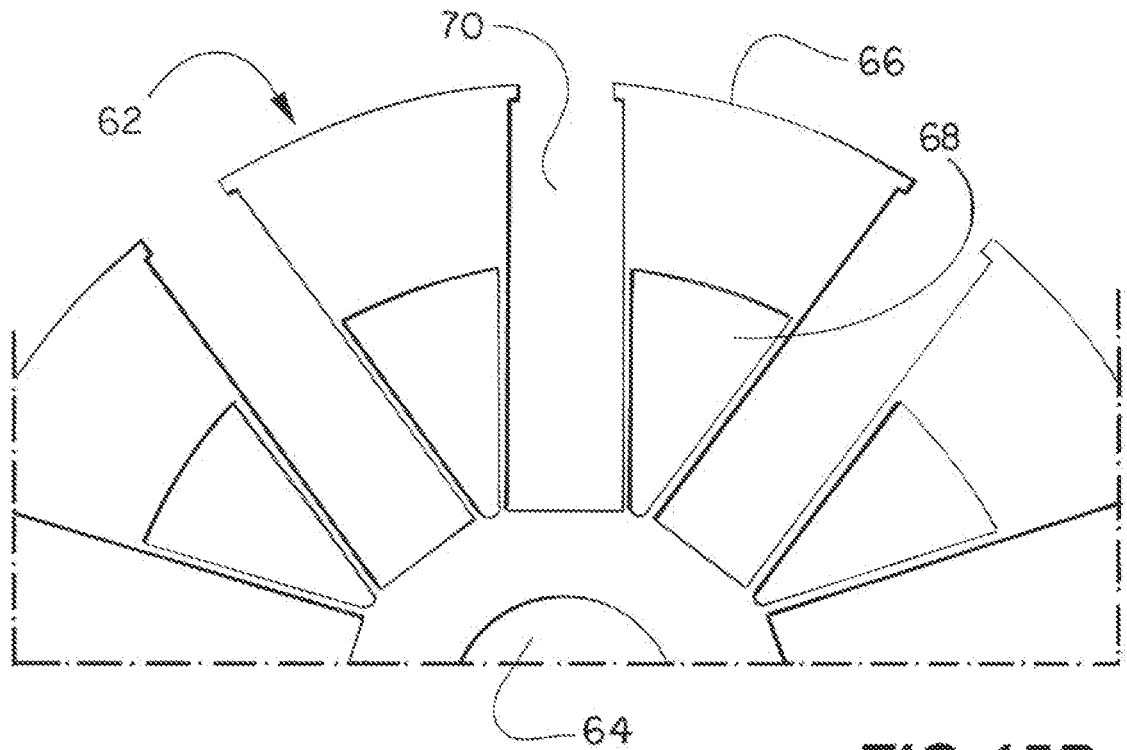

The outer radius 65 of the wedge-shaped magnet 68 was then increased to maximize torque output. Any increase in magnet material in the rotor would thus decrease performance. The rotor 62 requires that some area above the wedge-shaped magnet 68 have saliency (ferro-magnetic). Increasing the radius of the wedge-shaped magnet 68 (FIG. 15B and FIG. 15A) decreases the amount of saliency thus reducing torque output.

Figure 16:
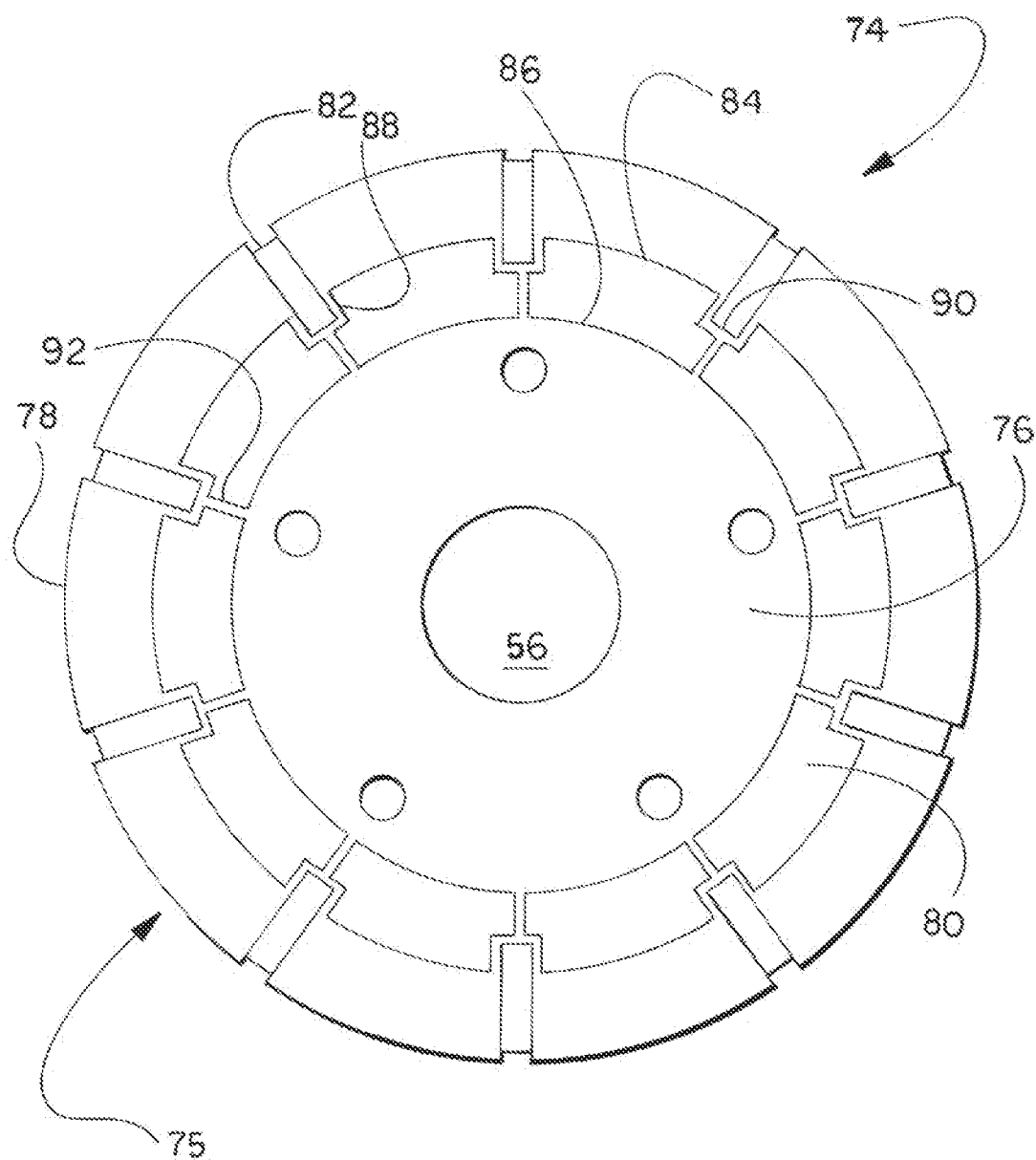
FIG. 16 is an elevation view of a second embodiment of the rotor (neo-ferrite rotor) of the internal rotor EC motor in accordance with the present invention.

FIG. 16 shows an alternative rotor embodiment, namely a neodymium-ferrite (neo-ferrite) rotor 74 for the internal rotor EC motor 10. The neo-ferrite rotor 74 has a center hub 76 attached to the shaft 56 of the internal rotor EC motor 10. The hub 76 supports 10 silicon steel laminates 78 evenly spaced around an outer circumference 75. Rectangular shaped permanent neodymium magnets 82 are positioned within gaps between adjacent steel laminates 78, are spaced circumferentially from each other, and are slightly recessed from the outer circumference 75. Wedge-shaped permanent ferrite magnets 80 are positioned radially between the silicon steel laminates 78 and the hub 76 and are spaced circumferentially from each other. The wedge-shaped permanent ferrite magnets 80 have outer radius 84 that contacts the silicon steel laminates 78 and an inner radius 86 that conforms to the circumference of the hub 76. Each wedge-shaped ferrite magnet 80 has a step 88 on each side between the outer radius 84 and the inner radius 86. Adjacent steps 88 between two adjacent the wedge-shaped ferrite magnets 80 create a recess that accommodates the inner end 90 of each of the rectangular neodymium magnets 82.

Figure 17A:
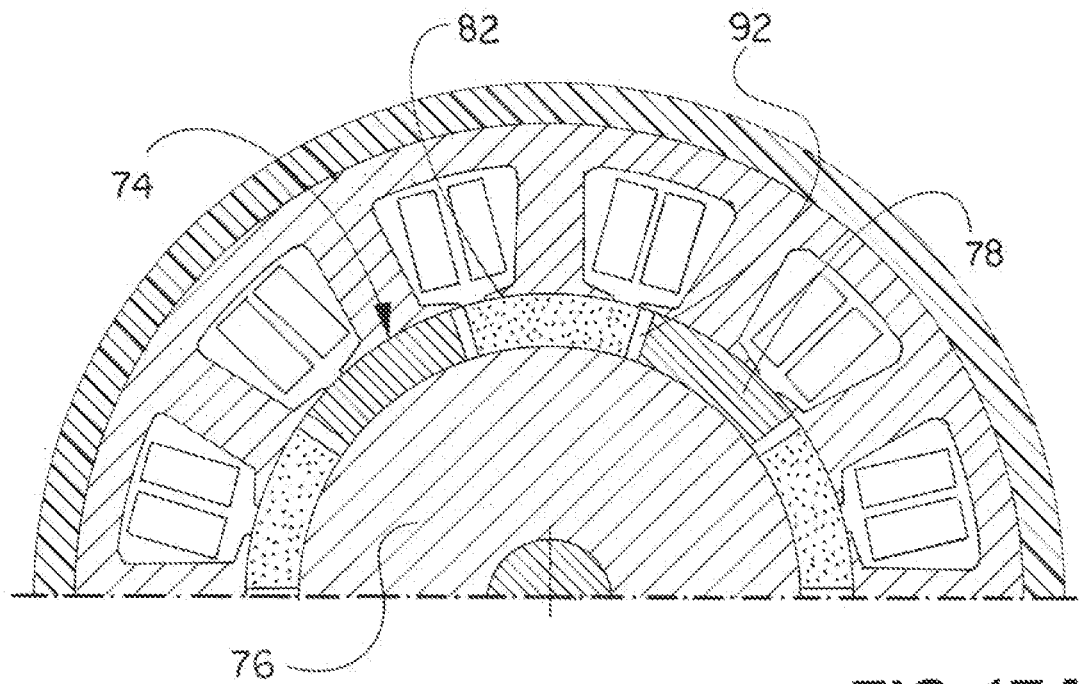
FIGS. 17A and 17B are schematic views of the second embodiment of the rotor (neo-ferrite rotor) of the internal rotor EC motor in accordance with the present invention. \
Figure 17B:
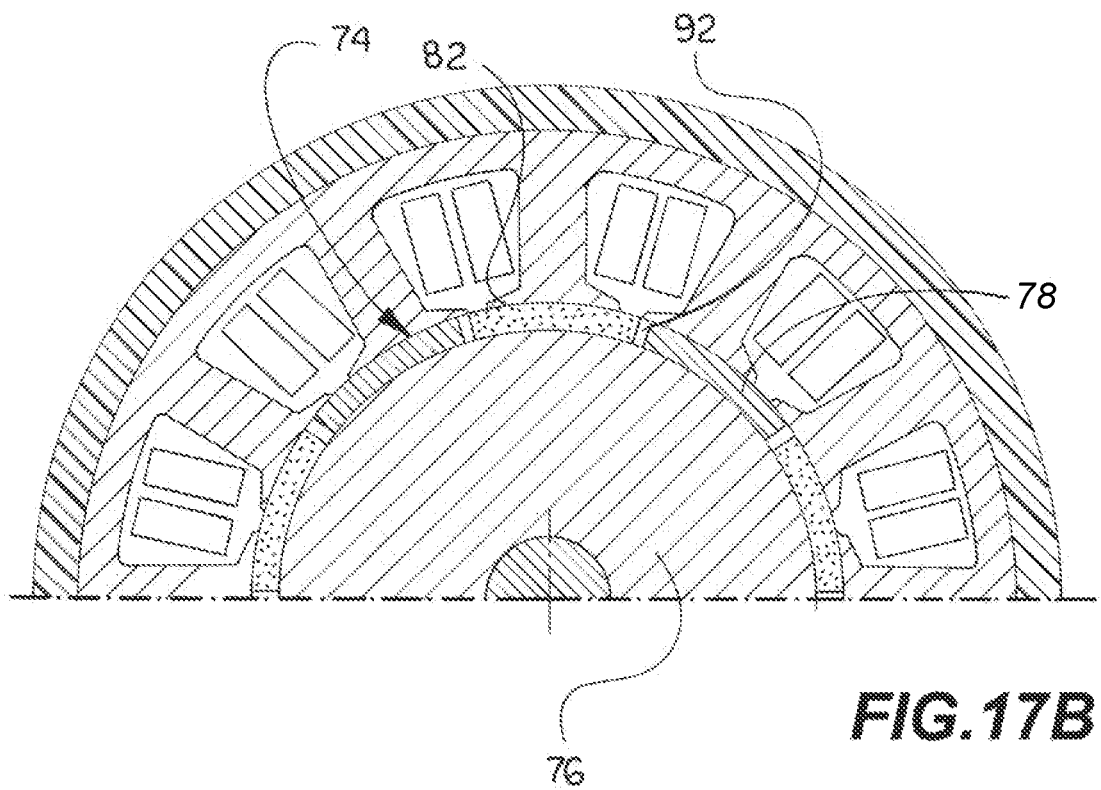

With reference to FIGS. 17A and 17B, the neo-ferrite rotor 74 includes alternate permanent neodymium magnets 82 and silicon steel laminates 78. The neo-ferrite rotor 74 in FIGS. 17A and 17B was optimized by modeling neo-ferrite rotor 74 and reducing the thickness of the rectangular neodymium magnets 82 until performance dropped below the target performance.

Figure 18:
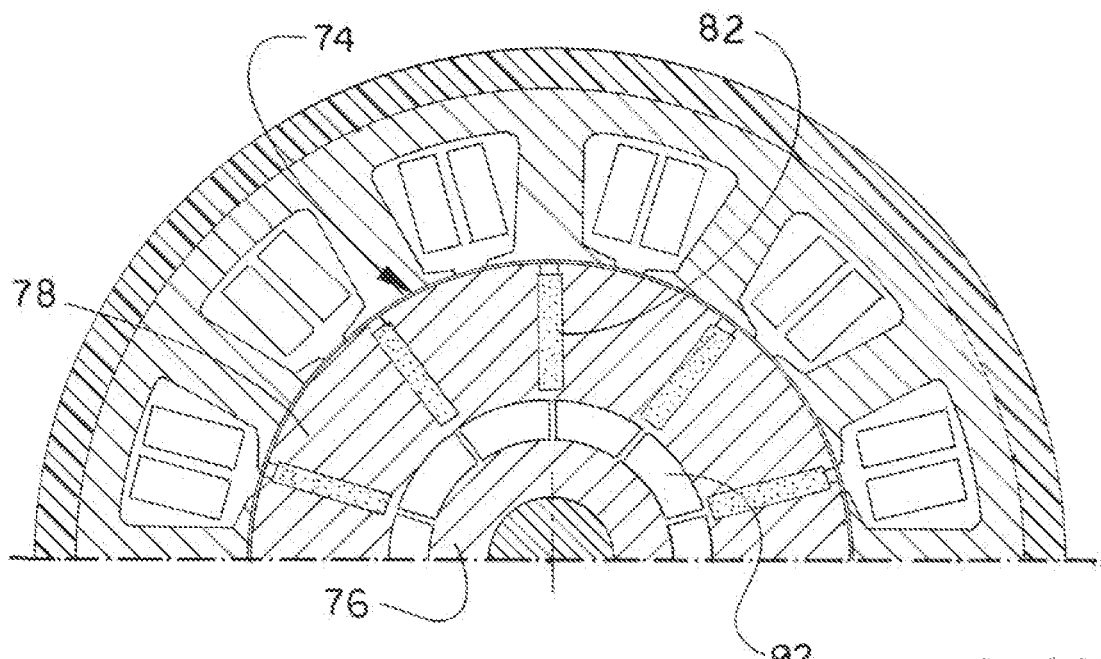
FIG. 18 is a schematic view of the second embodiment of the rotor (neo-ferrite rotor) of the internal rotor EC motor in accordance with the present invention.
Figure 19A:
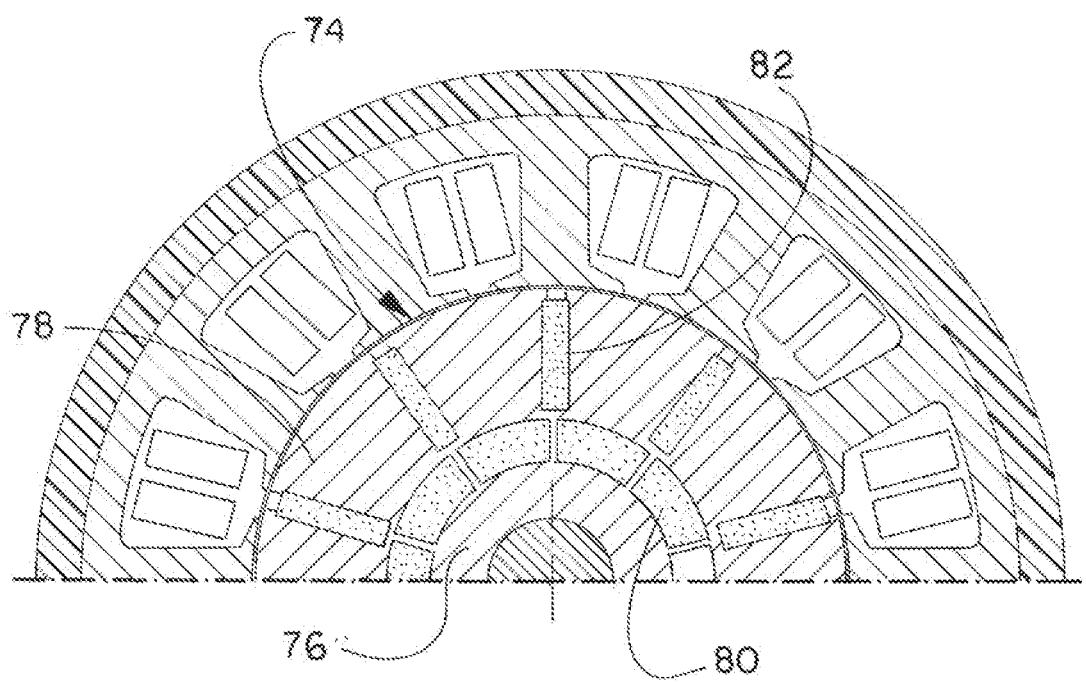
FIGS. 19A-19D are schematic views of the second embodiment of the rotor (neo-ferrite rotor) of the internal rotor EC motor in accordance with the present invention.
Figure 19B:
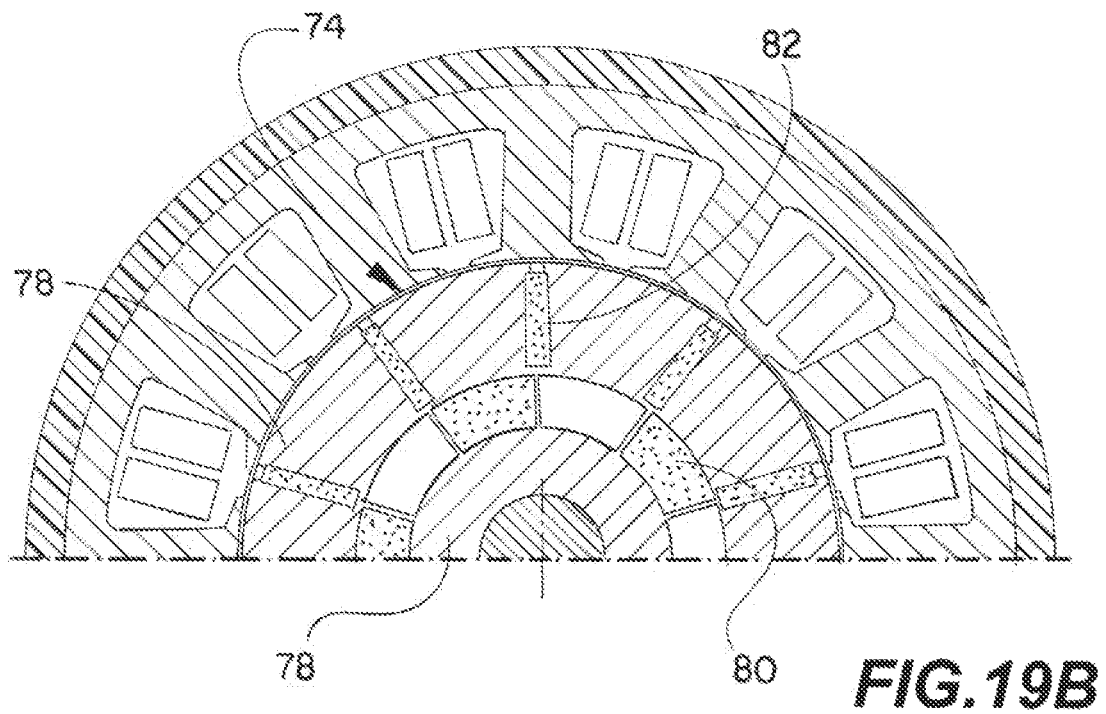
Figure 19C:
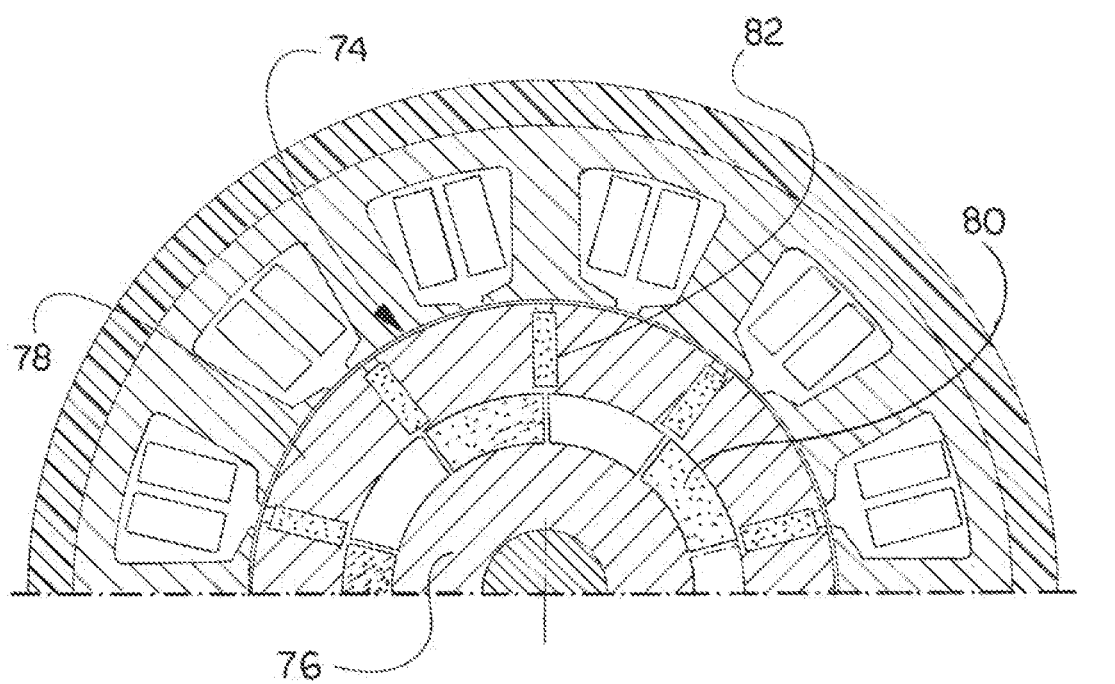
Figure 19D:
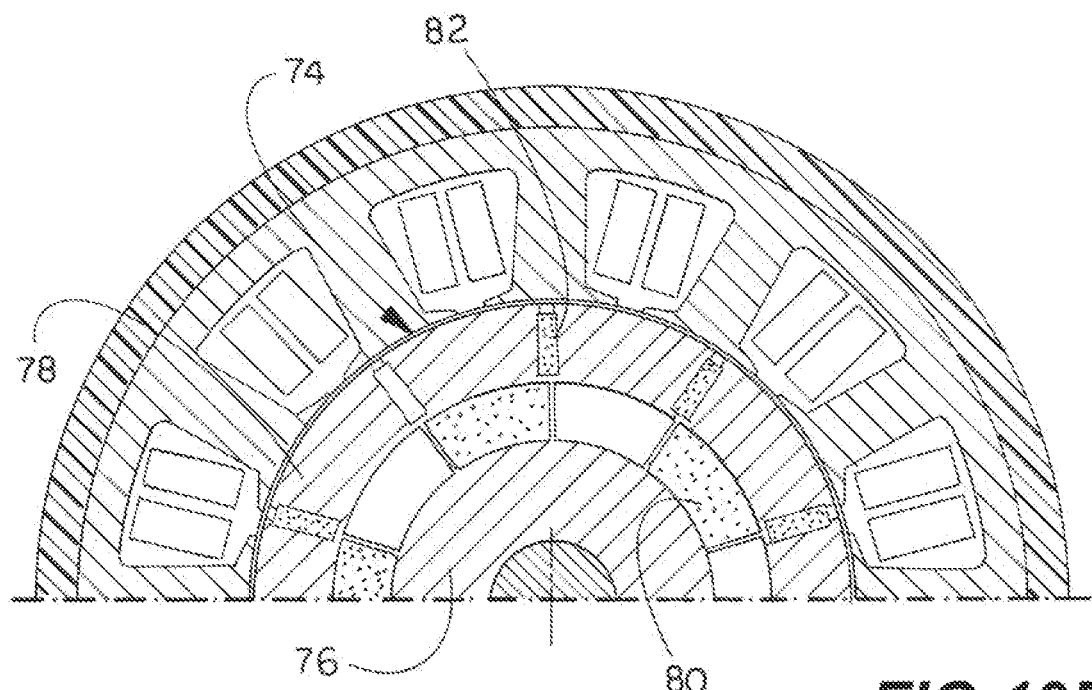

With reference to FIG. 18, an interior permanent magnet spoke type rotor 74 was then simulated using less magnet material for the rectangular neodymiun magnets 82 than for the rotor 74 shown in FIGS. 17A and 17B. Air gaps 92 were added between the rectangular neodymium magnets 82 to reduce magnetic leakage thus increasing performance.

With reference to FIGS. 19A-19D, the spoke type rectangular neodymium magnets 82 were then reduced in length until the performance dropped below the target performance. The air gaps 92 between the neodymium magnets 82 were then filled with wedge-shaped ferrite magnets 80 which increased performance.

Figure 20:
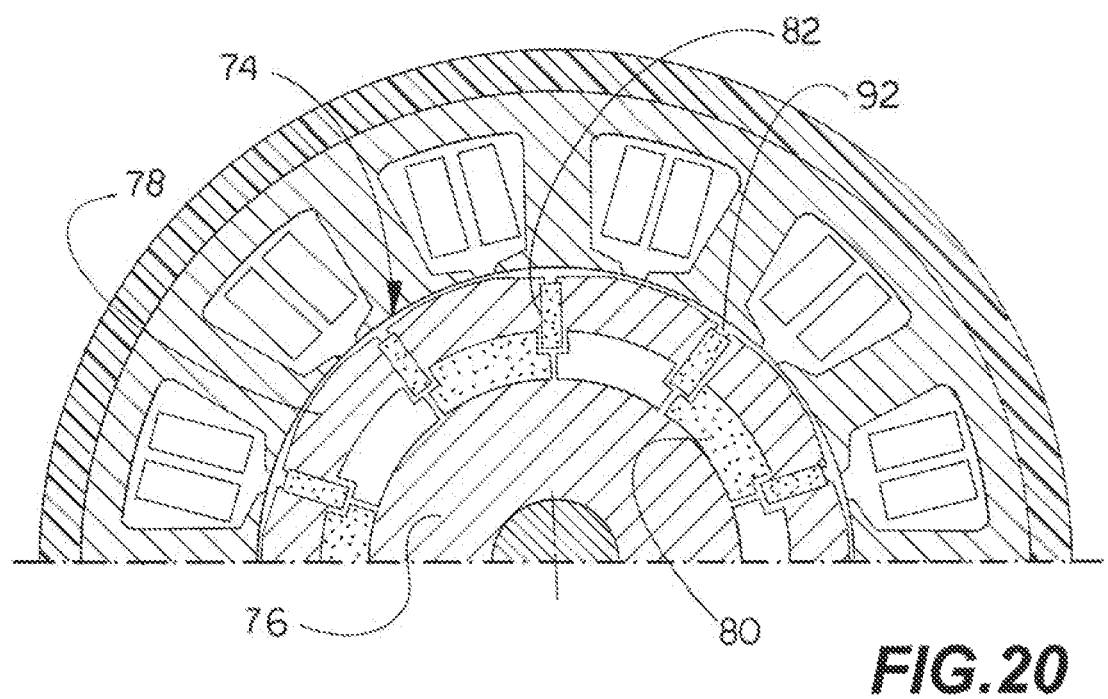
FIG. 20 is a schematic view of the second embodiment of the rotor (neo-ferrite rotor) of the internal rotor EC motor in accordance with the present invention.
Figure 21:
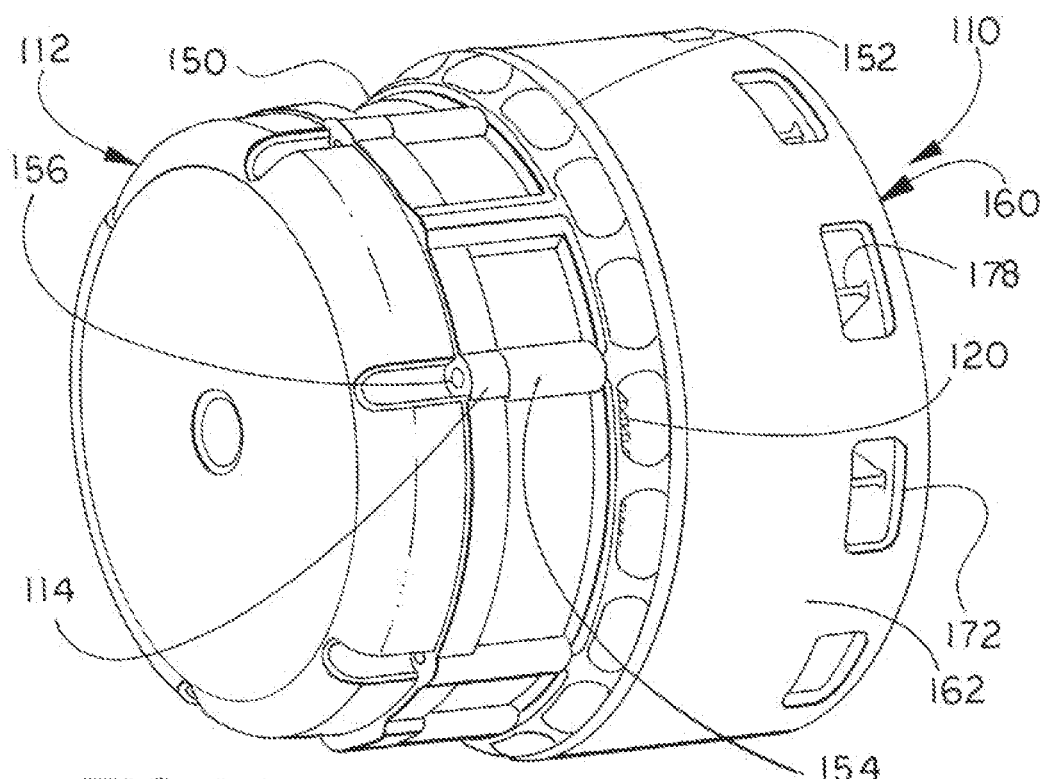
FIG. 21 is a perspective view of an external rotor EC motor in accordance with the present invention.
Figure 22:
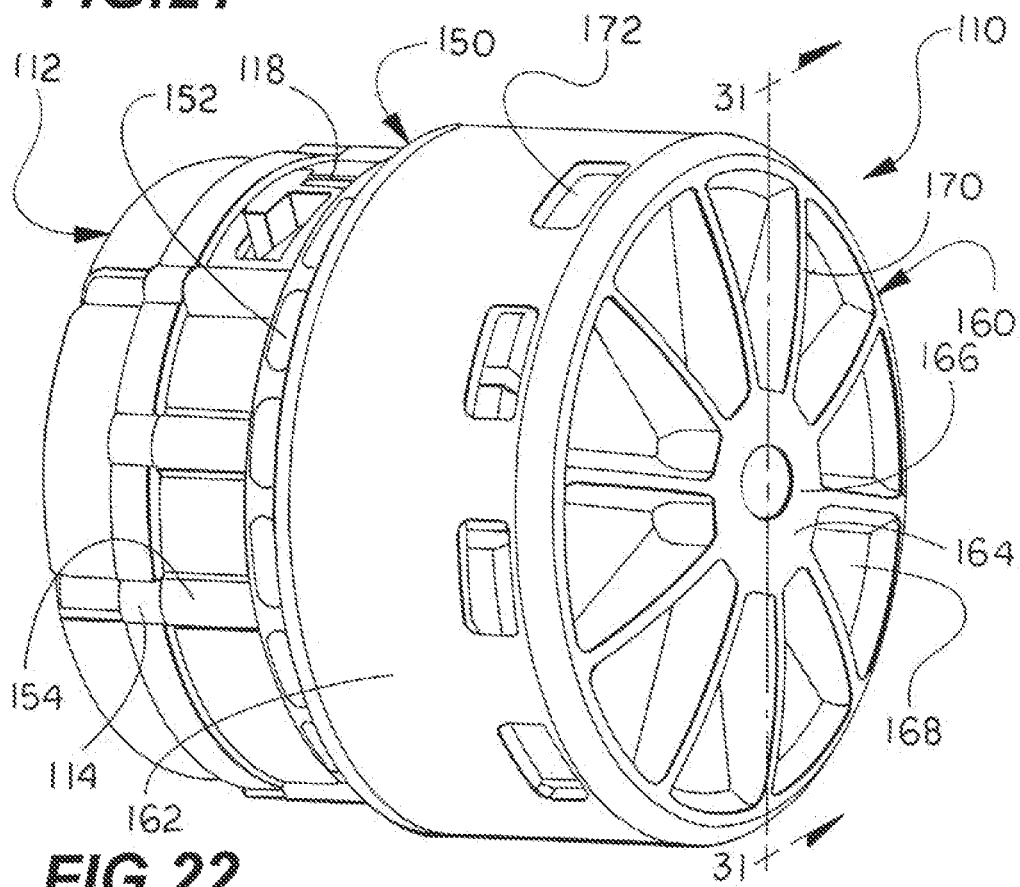
FIG. 22 is a perspective view of the external rotor EC motor in accordance with the present invention.
Figure 23:
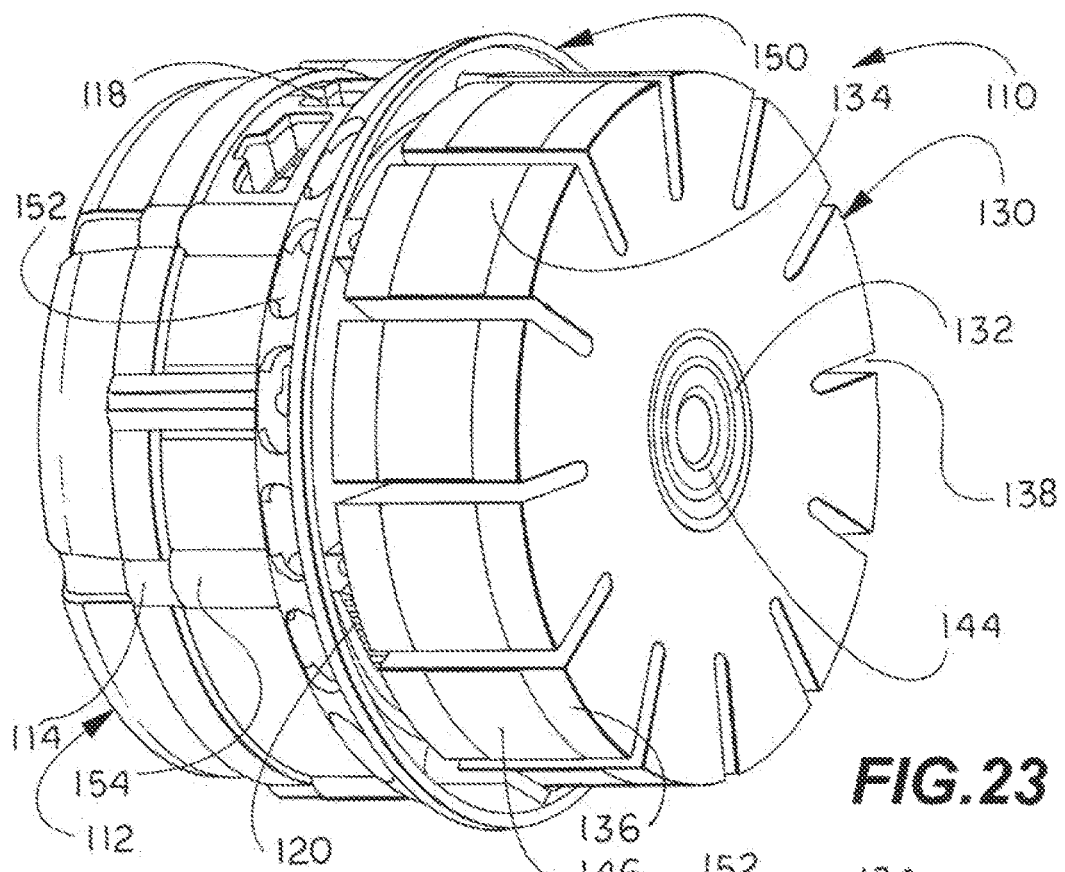
FIG. 23 is a perspective view of the external rotor EC motor with the external rotor removed in accordance with the present invention.
Figure 24:
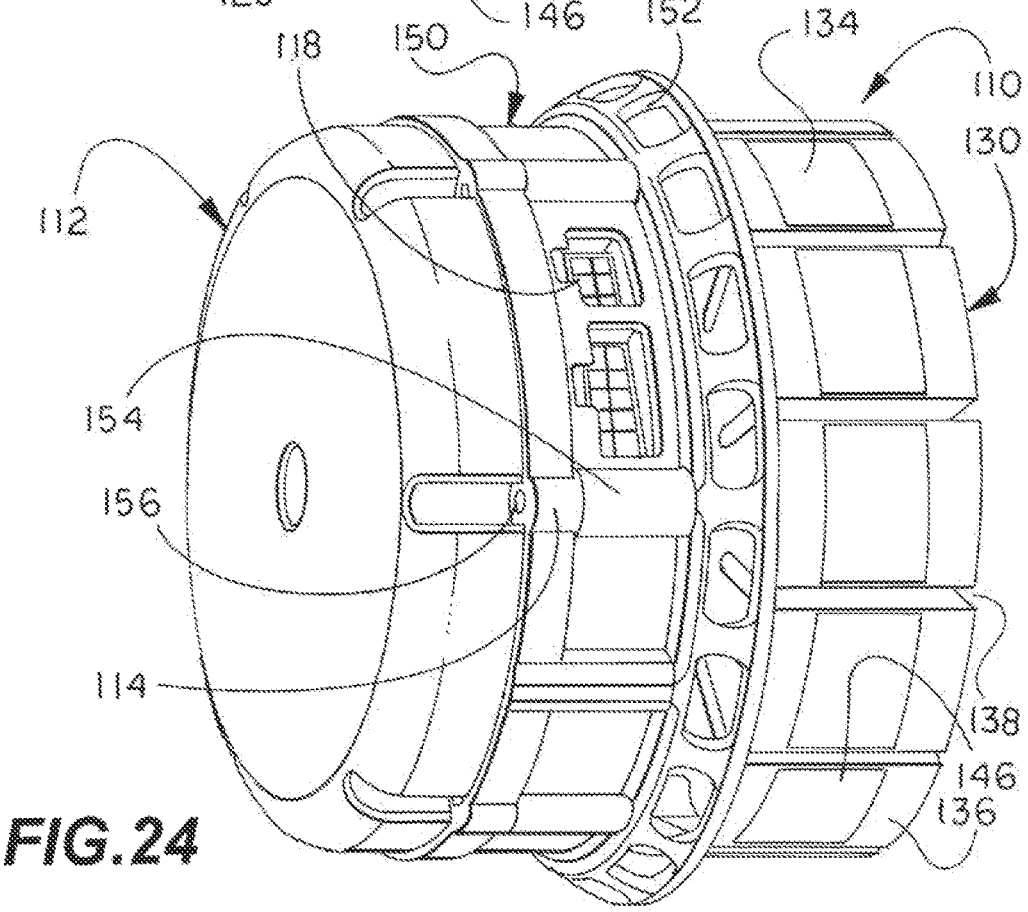
FIG. 24 is a perspective view of the external rotor EC motor with the external rotor removed in accordance with the present invention.
Figure 25:
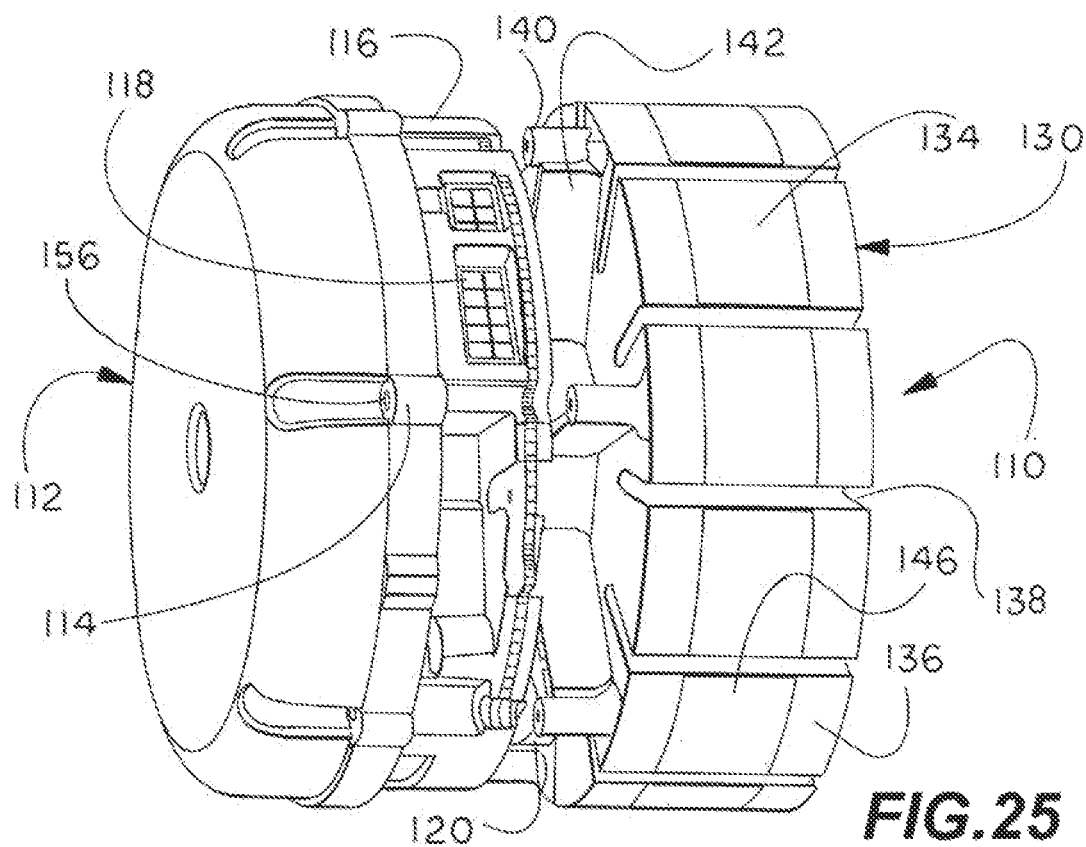
FIG. 25 is a perspective view of the external rotor EC motor with the external rotor and the stator cowl removed in accordance with the present invention.
Figure 26:
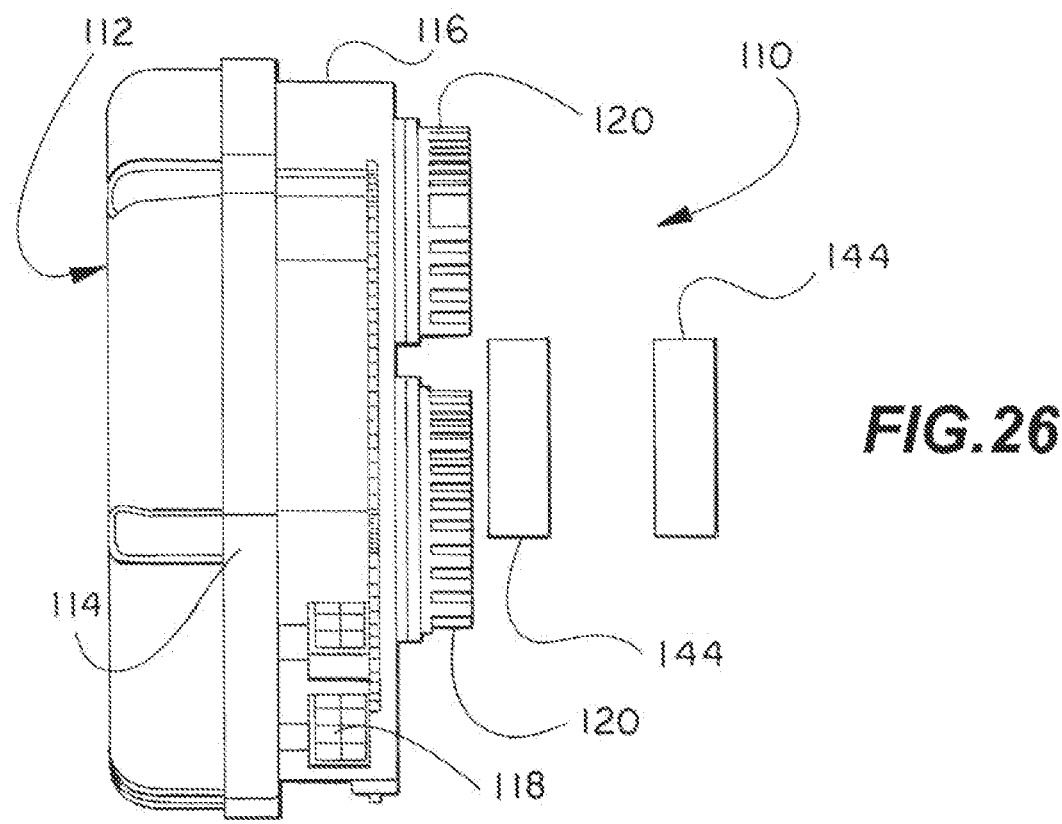
FIG. 26 is a front elevation view of the external rotor EC motor with the external rotor, the stator cowl, and the stator removed in accordance with the present invention.
Figure 27:
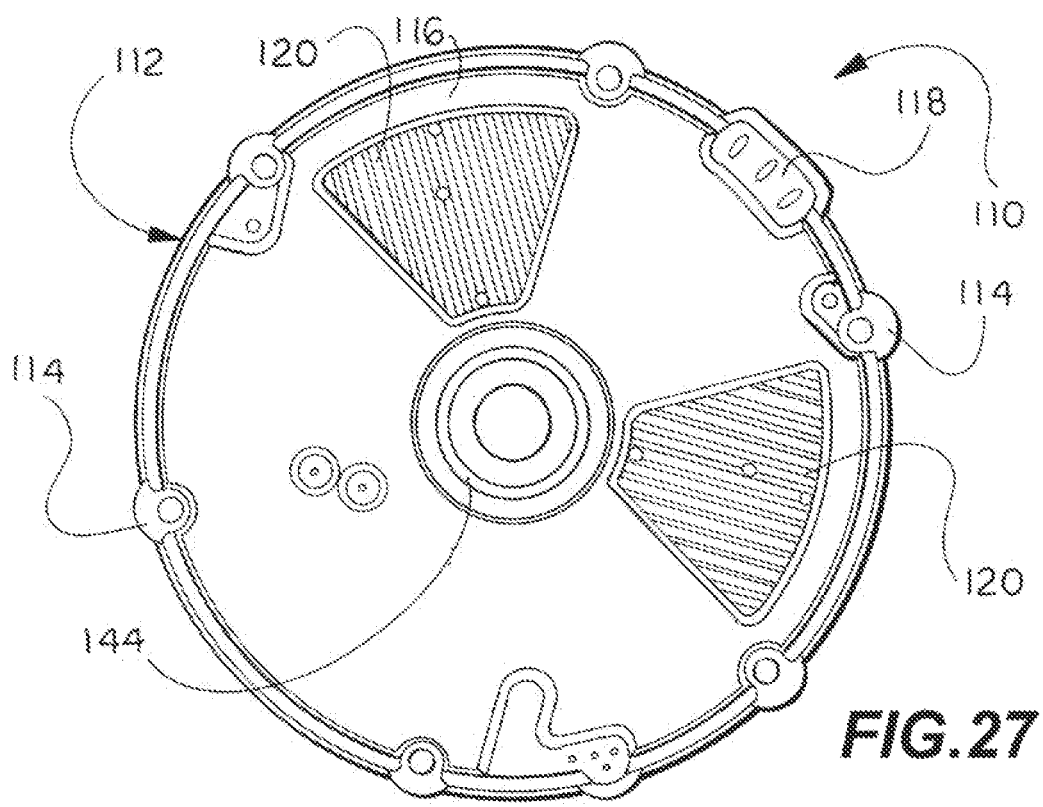
FIG. 27 is a right side elevation view of the external rotor EC motor with the external rotor, the stator cowl, and the stator removed in accordance with the present invention.
Figure 28:
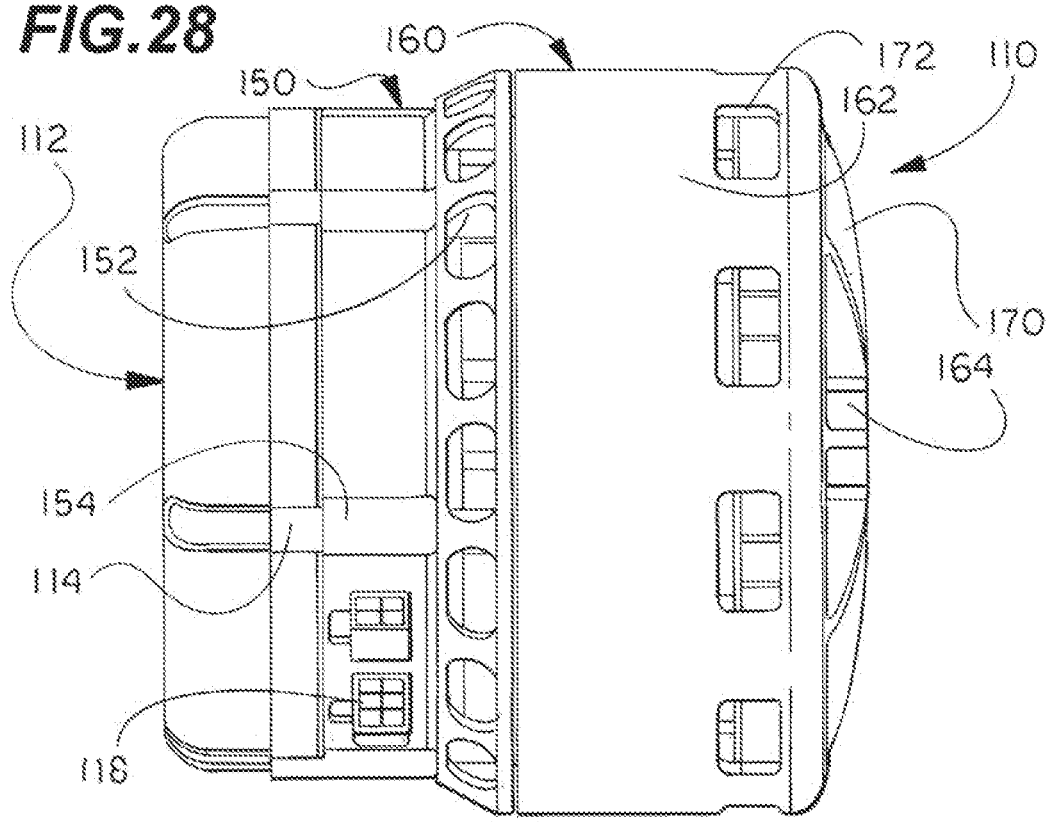
FIG. 28 is a side elevation view of the external rotor EC motor in accordance with the present invention.
Figure 27:
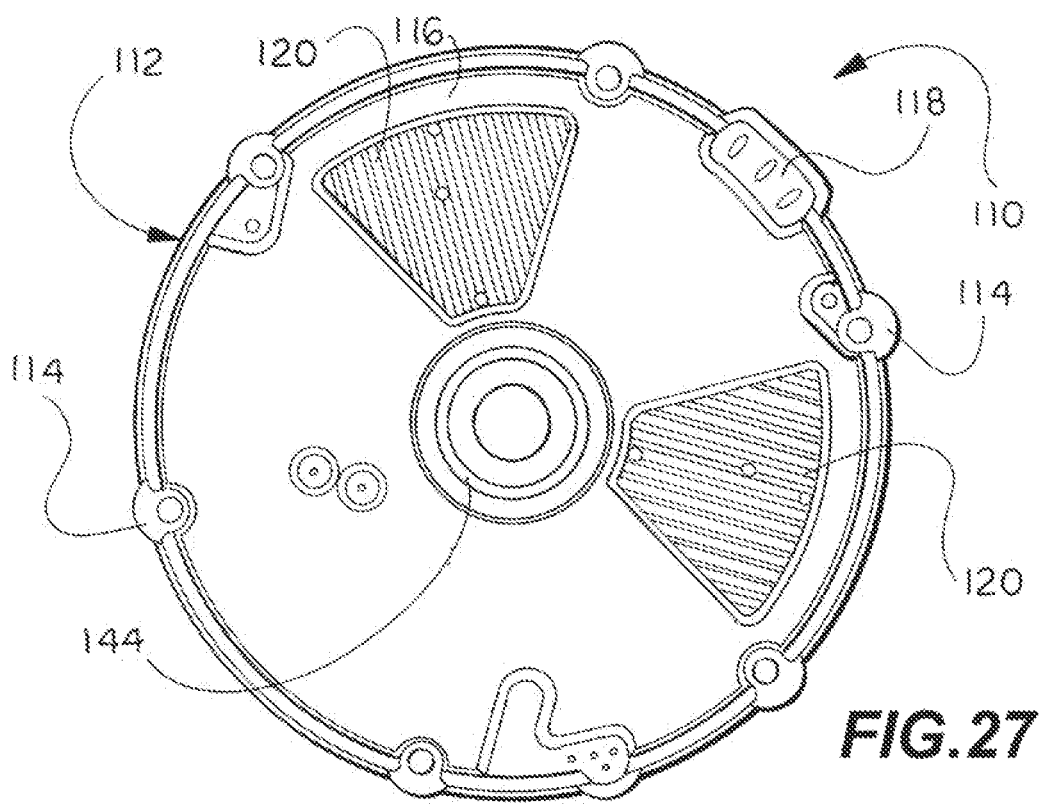
Figure 28:
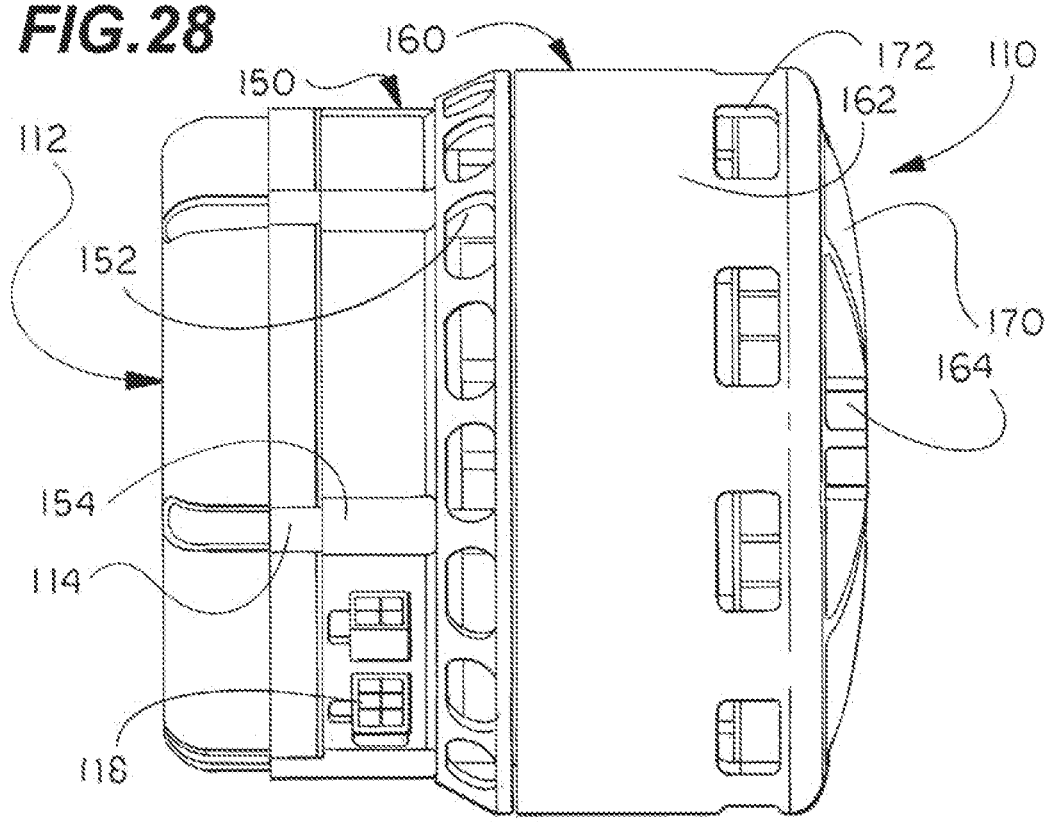

With reference to FIG. 20, the inner and outer radius of the ferrite magnets 80 were varied to maximize performance of the neo-ferrite rotor 74 resulting in an optimal combination of neodymium magnets 82 and ferrite magnets 80 minimize cost and maximize performance. The ferrite rotor 62 is lower cost than the neo-ferrite rotor 74 because neodymium is an order of magnitude more expensive per kg compared to ferrite. Neodymium also has higher magnetic flux than ferrite. For those reasons, the neo-ferrite rotor 74 is more efficient but is higher cost then the ferrite rotor 62.

A second embodiment of the electrically commutated DC motor is an external rotor EC motor 110. In the external rotor EC motor 110 in accordance with the present invention is shown in FIGS. 21-31. The external rotor EC motor 110 has a housing that includes a cylindrical controller shell 112 and a cylindrical stator cowl 150. A stationary stator 130 is attached to the cylindrical controller shell 112 and the cylindrical stator cowl 130 by means of connection tabs 114, cowl spacers 154, stator standoff posts 140 (FIG. 30), and connector screws 156 threaded into the stator standoff posts 140. An electronic controller 116 is mounted inside the cylindrical controller shell 112. Heatsinks 120 are thermally attached to the electronic controller 116 to dissipate heat generated by the electronics within the electronic controller 116 (FIGS. 21, 23, 25, 26, and 27). Electrical connectors 118 are provided to connect power and control signals to the external rotor DC motor 110.

With reference to FIGS. 23, 24, 25, and 30, the stationary stator 130 has a hub 132 within which are fitted stator bearings 144. Reinforcing ribs 142 radiate from the hub 132 and terminate at their distal ends with stator standoff posts 140 that, as previously described, serve to connect the stator 132 to the cylindrical controller shell 112 and the stator cowl 150. In the particular embodiment shown in FIG. 30, the stator 130 has 12 individual stator silicon steel laminate teeth 134. A gap or air channel 138 circumferentially separates the individual teeth 134. Each tooth 134 is wound with a conductive electromagnetic coil (not shown) to produce a rotating electromagnetic force as commonly understood in the art. The stator 130 has a plastic over molded structure 136 that covers the teeth 134 and the electromagnetic coil except for the convex outer tooth surface 146. The over molded structure 136 further leaves gaps or air channels 138 between the individual teeth 134. The plastic for the over molded structure is Rynite as previously described.

Figure 29:
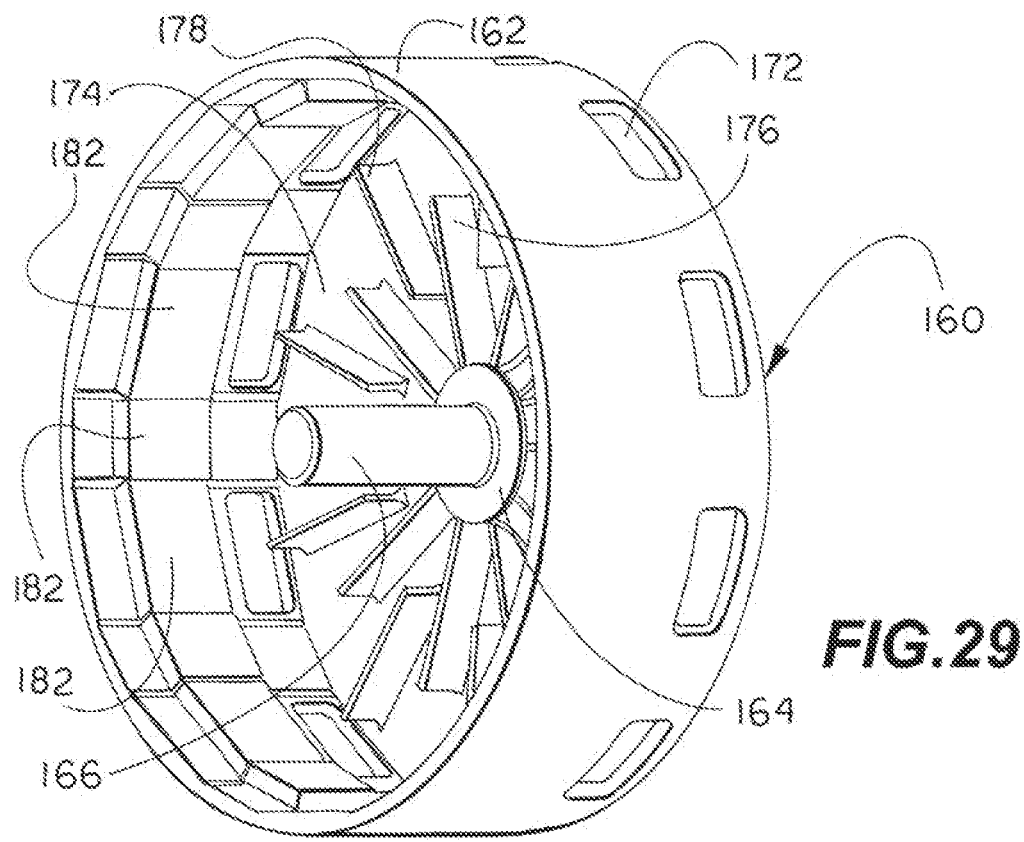
FIG. 29 is a perspective view of the rotor of the external rotor EC motor in accordance with the present invention.
Figure 30:
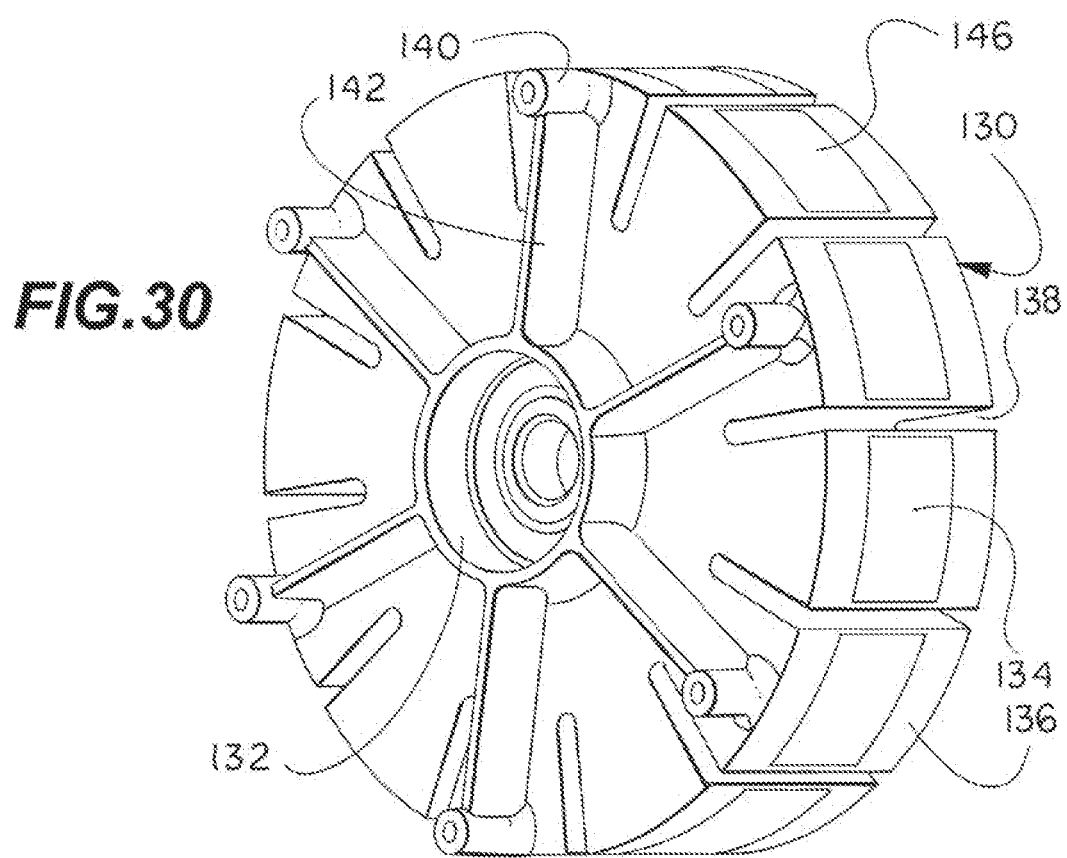
FIG. 30 is a perspective view of the stator of the external rotor EC motor in accordance with the present invention.
Figure 31:
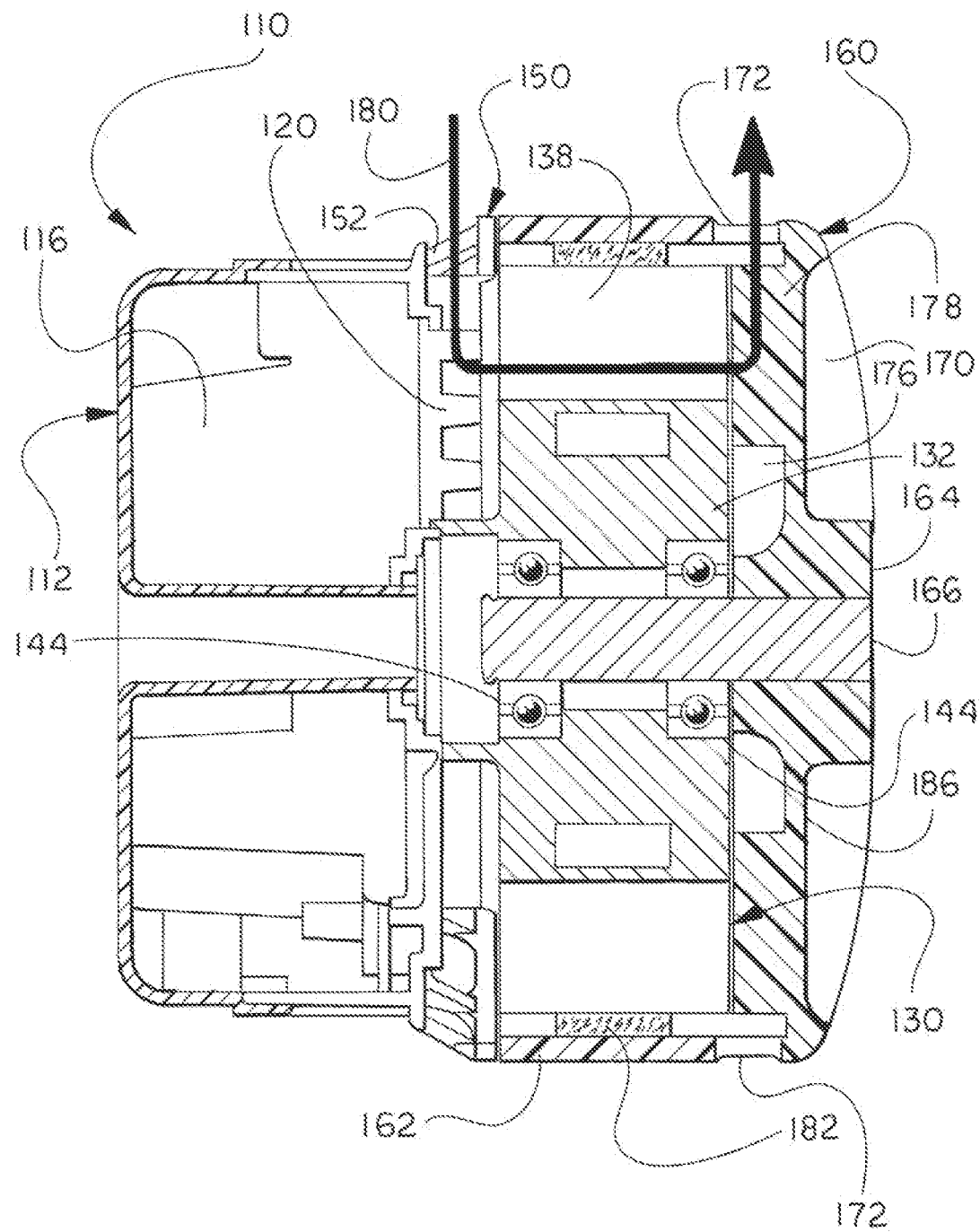
FIG. 31 is a section view of the external rotor EC motor as seen along line 31-31 in FIG. 22 in accordance with the present invention.

The rotor 160 includes a hub 164 to which a rotor shaft 166 is fixed. The rotor shaft 166 is mounted for rotation in stator bearings 144 (FIG. 31). An end cover 168 extends from the hub 164 and terminates with a cylindrical rotor shell 162. The end cover 168 has reinforcing ribs 170 on its outside surface. The inside surface of the end cover 168 comprises an impeller fan 174 (FIG. 29). The impeller fan 174 includes planar radially extending inner fan blades 176 and planar radially extending outer fan blades 178. The cylindrical rotor shell 162 has a number of air outlets 172 spaced around its periphery. A series of spaced apart permanent magnets 182 are attached around the internal surface of the cylindrical rotor shell and axially offset from the air outlets 172.

In operation, the rotating magnetic field created by the teeth 134 of the stator 130 interact with the permanent magnets 182 of the rotor 160 causing the rotor 160 to spin on the rotor shaft 166 within the bearings 144. As the rotor 160 spins, the fan blades 176 and 178 pull ambient air into the cowl inlet openings 152, past the heatsinks 120, through the stator air channels 138 and into the impeller fan 174. The fan blades 176 and 178 then expelled the air through air outlets 172 as shown by line 180 in FIG. 31. Consequently, the ambient air first dissipates heat from the heatsinks 120 to keep the electronics of the electronic controller 116 cool. Next, the ambient air passes through the stator air channels 138 to keep the stator 130 cool. Because the fan blades 176 and 178 are planar and not curved, the ambient air is pulled into the cowl inlet openings 152, through the stator air channels 138, and pushed out through the air outlets 172 regardless of the direction of rotation of the fan 174.

While this invention has been described with reference to preferred embodiments thereof, it is to be understood that variations and modifications can be affected within the spirit and scope of the invention as described herein and as described in the appended claims.

I claim:

1. A rotor for an internal rotor EC motor comprising:
   a. a central hub connected to an axis for rotation;
   b. outwardly extending silicon steel laminates positioned around the circumference of the rotor and spaced circumferentially around the rotor with gaps between adjacent silicon steel laminates;
   c. first permanent magnets interposed in the gaps between the silicone steel laminates; and
   d. second permanent magnets aligned radially with the silicon steel laminates and positioned between the steel laminates and the central hub of the rotor,
   wherein the first permanent magnets are rectangular in shape with a rectangular area in a plane perpendicular to the axis and wherein the second permanent magnets are wedge-shaped with a radius.

2. A rotor for an internal rotor EC motor comprising:
   a. a central hub connected to an axis for rotation;
   b. outwardly extending silicon steel laminates positioned around the circumference of the rotor and spaced circumferentially around the rotor with gaps between adjacent silicon steel laminates;
   c. first permanent magnets interposed in the gaps between the silicone steel laminates; and
   d. second permanent magnets aligned radially with the silicon steel laminates and positioned between the steel laminates and the central hub of the rotor,
   wherein adjacent second wedge-shaped permanent magnets have a step on each side that create a recess that accommodates the first rectangular permanent magnet.

3. The rotor of claim 1, wherein the first permanent magnets are neodymium magnets and wherein the second permanent magnets are ferrite magnets.

4. The rotor of claim 1, wherein adjacent second wedge-shaped permanent magnets have a step on each side that create a recess that accommodates the first rectangular permanent magnet.

5. The rotor of claim 2, wherein the first permanent magnets are rectangular in shape with a rectangular area in a plane perpendicular to the axis and wherein the second permanent magnets are wedge-shaped with a radius.

6. The rotor of claim 2, wherein the first permanent magnets are neodymium magnets and wherein the second permanent magnets are ferrite magnets.

* * * * *